United States Patent
Tabata et al.

[19]

[11] Patent Number: 5,982,045
[45] Date of Patent: Nov. 9, 1999

[54] HYBRID VEHICLE DRIVE SYSTEM ADAPTED TO PREVENT CONCURRENT MODE CHANGE AND TRANSMISSION SHIFTING OR TORQUE DISTRIBUTION RATIO CHANGE

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 08/838,130

[22] Filed: Apr. 15, 1997

[30] Foreign Application Priority Data

| Apr. 19, 1996 | [JP] | Japan | .................................. 8-97232 |
| May 28, 1996 | [JP] | Japan | ................................ 8-133252 |
| Aug. 22, 1996 | [JP] | Japan | ................................ 8-220247 |

[51] Int. Cl.$^6$ .............................. B60L 11/12; B61C 9/38
[52] U.S. Cl. ..................... 290/17; 290/40 A; 290/40 B; 290/40 E; 290/40 F; 290/34; 290/36 R; 290/37 A; 290/37 B
[58] Field of Search .............................. 290/40 C, 40 R, 290/37, 45, 50; 180/65.3, 65.4, 65.1, 65.2; 471/3; 318/148, 146

[56] References Cited

U.S. PATENT DOCUMENTS

| 5,021,031 | 6/1991 | Hibi | ........................................ 474/18 |
| 5,359,228 | 10/1994 | Yoshida | ..................................... 290/17 |
| 5,495,912 | 3/1996 | Gray, Jr. et al. | ......................... 180/165 |
| 5,558,175 | 9/1996 | Sherman | ................................. 180/65.2 |
| 5,704,440 | 1/1998 | Urban et al. | ............................ 180/65.2 |
| 5,713,425 | 2/1998 | Buschhaus et al. | .................... 180/65.2 |
| 5,722,502 | 3/1998 | Kubo | ...................................... 180/65.4 |
| 5,789,882 | 8/1998 | Ibaraki et al. | ........................... 318/148 |

FOREIGN PATENT DOCUMENTS

A-7-67208    3/1995    Japan .

*Primary Examiner*—Elvin G. Enad
*Attorney, Agent, or Firm*—Oliff & Berridge, PLC

[57] ABSTRACT

A hybrid drive system including an engine and an electric motor at least one of which is operated as drive power source to drive a motor vehicle in a selected one of different operation modes. The system is adapted to prevent concurrent operations to change the operation mode and the speed ratio of a power transmitting device or the ratio of torque distribution to front and rear drive wheels, or concurrent operations to change the operation mode and switch the power transmitting device from a non-drive state to a drive state, for avoiding a shock due to a torque variation which would arise from the concurrent operations. The system is alternatively adapted to cut a power transfer from the drive power source to the power transmitting device, or hold the output of the drive power source substantially constant, when the power transmitting device is switched from the non-drive state to the drive state.

35 Claims, 24 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | ○ | ○ | | | −4.550 |
| DRIVE | 1st | ○ | ○ | | | | | | ● | ○ | | ○ | 3.357 |
| DRIVE | 2nd | ● | ○ | | | | | ○ | | ○ | | | 2.180 |
| DRIVE | 3rd | ○ | ○ | | | ● | ○ | | | ○ | ○ | | 1.424 |
| DRIVE | 4th | ○ | ○ | ○ | | | ○ | | | ○ | | | 1.000 |
| DRIVE | 5th | | ○ | ○ | ○ | | ○ | | | | | | 0.753 |

FIG. 9

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 17

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | ● | | | ● | | ○ | 3.357 |
| | 2nd | ○ | | | | ○ | | | | 2.180 |
| | 3rd | ○ | | | ○ | | | ○ | | 1.424 |
| | 4th | ○ | ○ | | ○ | | | | | 1.000 |

FIG. 24

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | -4.550 |
| DRIVE | 1st | ○ | | | | | ● | | ○ | 3.357 |
| | 2nd | ○ | | | | ○ | | | | 2.180 |
| | 3rd | ○ | | ● | ○ | | | ○ | | 1.424 |
| | 4th | ○ | ○ | | ○ | | | | | 1.000 |

HYBRID VEHICLE DRIVE SYSTEM ADAPTED TO PREVENT CONCURRENT MODE CHANGE AND TRANSMISSION SHIFTING OR TORQUE DISTRIBUTION RATIO CHANGE

This application is based on Japanese Patent Applications No. 8-97232 filed Apr. 19, 1996, No. 8-133252 filed May 28, 1996 and No. 8-220247 filed Aug. 22, 1996, the contents of which are incorporated hereinto by reference.

BACKGROUND OF THE INVENTION

1. Field of the Invention

The present invention relates in general to a hybrid drive system for a motor vehicle, and more particularly to techniques for reducing a shock generated upon changing of an operation mode of the hybrid drive system, upon shifting of an automatic transmission from one forward drive position to another forward drive position, upon changing of a ratio of torque distribution to front and rear wheels of the vehicle, or upon shifting of the automatic transmission from a non-drive position such as a neutral position to a drive position such as a forward or reverse drive position.

2. Discussion of the Related Art

JP-A-7-67208 discloses an example of a known hybrid drive system of a motor vehicle, which is equipped with a drive power source including an engine operated by combustion of a fuel, and an electric motor operated with an electric energy. At least one of the engine and the electric motor is operated in a selected one of a plurality of operations modes, for driving the motor vehicle.

For example, the operation modes of the hybrid drive system includes an engine drive mode in which only the engine is operated as the drive power source to drive the vehicle, a motor drive mode in which only the electric motor is operated as the drive power source, and an engine•motor drive mode in which both the engine and the electric motor are operated as the drive power source. One of the operation modes is selected on the basis of suitable operating parameters of the vehicle, for instance, the vehicle running speed (or the speed of the currently selected drive power source) and the operating amount of an accelerator pedal, and according to a suitable mode selecting or changing pattern as represented by a stored data map.

Such a hybrid drive system may include a power transmitting device in the form of an automatic transmission which is disposed between the drive power source and drive wheels of the vehicle and whose speed ratio is variable. The speed ratio of the automatic transmission is selected or changed on the basis of suitable operating parameters of the vehicle, for instance, the vehicle running speed and the operating amount of the accelerator pedal, and according to a suitable transmission shifting pattern as represented by a stored data map. Between the drive power source and the drive wheels of the vehicle, a torque distributing mechanism may also be disposed for changing the ratio of torque distribution to the front and rear drive wheels. The torque distribution ratio is selected or changed on the basis of suitable parameters such as the yaw rate, steering angle and running speed of the vehicle, and according to a suitable torque distribution changing pattern as represented by a stored data map.

Where the hybrid drive system is adapted such that the control to select or change the operation mode, the control to shift the automatic transmission and the control to select or change the torque distribution ratio are effected independently of each other, and operation to select the operation mode may take place concurrently with a shifting action of the automatic transmission or an operation to change the torque distribution ratio. In this case, the hybrid drive system tends to have a considerable variation in the vehicle drive torque, and difficulty to suitably control the drive power source, automatic transmission and torque distribution mechanism, and is likely to suffer from a shock upon simultaneous operations to change the operation mode, shift the automatic transmission and/or change the torque distribution ratio. The shifting actions of the automatic transmission may include a so-called "clutch-to-clutch shifting action wherein one of two frictional coupling devices is engaged while the other frictional coupling device is released, to shift the transmission from one gear position to another. In such a clutch-to-clutch shifting action, the pressure of the frictional coupling device that is to be engaged is required to be intricately controlled according to the input torque of the transmission. If the clutch-to-clutch shifting action is effected while at the same time the operation mode is changed, a torque variation due to the operation to change the operation mode undesirably deteriorates the accuracy of control of the engaging pressure of the above-indicated frictional coupling device, leading to easy generation of a shifting shock of the automatic transmission.

The shifting pattern of the automatic transmission may be formulated so as to maximize the energy efficiency or minimize the fuel consumption of the vehicle, for each of the operation modes. In this case, shift boundary lines for one operation mode are not continuous with shift boundary lines for another operation mode. This may cause frequent shifting actions of the automatic transmission upon changing of the operation mode, resulting in a change in the speed ratio of the automatic transmission in a relatively short time. FIG. 11A shows examples of mode changing patterns and transmission shifting patterns. Described more specifically, hatched area in FIG. 11A indicates a motor drive condition in which the motor drive mode is selected, while non-hatched area indicates an engine drive condition in which the engine drive mode is selected. As is apparent from FIG. 11A, the engine drive mode is selected when the vehicle running speed V or the engine load as represented by the operating amount $\theta_{AC}$ of the accelerator pedal is comparatively high. In the motor drive mode, the automatic transmission is shifted according to shift boundary lines (transmission shifting pattern) indicated by broken lines. In the engine drive mode, the automatic transmission is shifted according to shift boundary lines indicated by solid lines. In FIG. 11A, "1", "2", "3" and "4" indicate first-, second-, third- and fourth-speed positions of the automatic transmission. As indicated in the figure, the shift boundary lines for the motor drive mode are not continuous with the shift boundary lines for the engine drive mode, at a boundary between the motor drive condition and the engine drive condition. In the arrangement of FIG. 11A, therefore, a change of the vehicle operating or running state from point A to point B, for example, will cause a change of the operation mode from the motor drive mode to the engine drive mode, and a simultaneous shift-up action of the automatic transmission from the second-speed position to the third-speed position. A change of the vehicle running state from point A' to point B' will cause a change of the operation mode from the motor drive mode to the engine drive mode, and a simultaneous shift-up action of the automatic transmission from the third-speed position to the fourth-speed position, which is followed by a shift-down action from the fourth-speed position to the third-speed position.

The automatic transmission, which is a power transmitting device adapted to transmit power from the drive power source to the drive wheels of the vehicle, may have a plurality of drive positions having respective different speed ratios, which are selectively established by selective engagement and disengagement of coupling devices such as clutches and brakes. Alternatively, the automatic transmission may be a continuously variable transmission of belt-and-pulley type or toroidal type whose speed ratio is continuously variable. The automatic transmission as the power transmitting device has non-drive positions such as a neutral position "N" and a parking position "P", and drive positions such as a drive position "D" and a reverse position "R". These non-drive and drive positions are selectively established by manually operated transmission switching means such as a combination of a shift lever and a manual shift valve mechanically connected to the shift lever.

In such a hybrid drive system having a power transmitting device and manually operated transmission switching means, the power transmitting device may not be smoothly shifted from a non-drive position to a drive position, or may suffer from a shifting shock, due to a change in the output of the drive power source, which may arise from a change in the operating amount of the accelerator pedal or a change in the operation mode, when the power transmitting device is commanded to be shifted from the non-drive position to the drive position.

SUMMARY OF THE INVENTION

It is therefore a first object of the present invention to provide a hybrid drive system for a motor vehicle, which is adapted to prevent or minimize the generation of a shock upon concurrent operations to change the operation mode and shift the automatic transmission or change the torque distribution ratio.

It is a second object of the present invention to provide a hybrid drive system for a motor vehicle, which has a power transmitting device disposed between the drive power source and the vehicle drive wheel, and which is adapted to prevent or minimize a shifting shock of the power transmitting device upon shifting thereof from a non-drive position to a drive position.

The first object may be achieved according to a first aspect of this invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) an automatic transmission which is disposed between the drive power source and a drive wheel of the motor vehicle and whose speed ratio is variable; (c) mode selecting means for selecting one of the plurality of operation modes, according to a predetermined mode selecting pattern; (d) shift control means for controlling the automatic transmission to change a speed ratio thereof, according to a predetermined shifting pattern; and (e) mode change restricting means for restricting a change of the operation mode of the motor vehicle by the mode selecting means when the speed ratio of the automatic transmission is changed by the shift control means.

In the vehicle hybrid drive system constructed according to the first aspect of this invention, a change of the operation mode by the mode selecting means is restricted by the mode change restricting means when the speed ratio of the automatic transmission is changed by the shift control means.

Thus, the present hybrid drive system is adapted to minimize or prevent a change of the operation mode concurrently with a shifting action of the automatic transmission, thereby minimizing or preventing a shifting shock of the automatic transmission due to a torque variation which would occur if the operation mode were changed during a shifting action of the automatic transmission.

The present hybrid drive system including the engine and the electric motor as the drive power source and the mode change restricting means may be adapted such that the different operation modes are selectively established by selective engagement and disengagement of clutches for selective connection and disconnection of the engine and electric motor to and from the automatic transmission, or by a synthesizing and distributing mechanism such as a planetary gear mechanism adapted to synthesize and distribute the outputs of the engine and electric motor. Alternatively, the hybrid drive system may be arranged such that the engine is used as a primary drive power source while the electric motor is used as an auxiliary drive power source. The operation modes may include an engine drive mode in which only the engine is used as the drive power source for driving the vehicle, a motor drive mode in which only the electric motor is used as the drive power source, and an engine•motor drive mode in which both the engine and the electric motor are used as the drive power source. An appropriate one of the operation modes is selected on the basis of suitable operating parameters of the motor vehicle such as the vehicle running speed and the operating amount of the accelerator pedal, and according to a predetermined mode selecting pattern as represented by a stored data map.

Preferably, the automatic transmission provided in the present hybrid drive system is shifted by hydraulically operated coupling devices such as hydraulically operated clutches and brakes. The automatic transmission may have at least one operating position which is established by a so-called clutch-to-clutch shifting action which is effected by engaging one of two clutches while at the same time releasing the other clutch. The automatic transmission may be shifted to change its speed ratio, on the basis of suitable parameters such as the vehicle running speed and the operating amount of the accelerator pedal, and according to a predetermined shift pattern as represented by a stored data map. The automatic transmission may be a continuously variable transmission of a belt-and-pulley type or toroidal type.

In one preferred form of the first aspect of the invention, the mode change restricting means includes determining means for determining whether a shifting action of the automatic transmission is terminated. In this case, the mode change restricting means inhibits the mode selecting means from changing the operation mode until the determining means has determined that the shifting action of the automatic transmission is terminated. In this form of the invention, the hybrid drive system further comprises means for permitting the mode selecting means to change the operation mode after the determining means has determined that the shifting action of the automatic transmission is terminated. However, if a determination by the mode selecting means that the operation mode should be changed from one operation mode to another is made prior to the initiation of a shifting action of the automatic transmission, the shifting action may be deferred so that the operation mode is first changed and the shifting action is then initiated.

In a second preferred form of the first aspect of the invention, the automatic transmission has a forward drive position which is established by a so-called clutch-to-clutch shifting action, which is achieved by engaging one of two clutches while at the same time releasing the other of these two clutches. In this case, the mode change restricting means is adapted to restrict or inhibit a change of the operation mode by the mode selecting means while the automatic transmission is shifted to that forward drive position. However, the mode change restricting means may be adapted to restrict or inhibit a change of the operation mode while the automatic transmission is shifted to any other specific operating position. Further, the mode change restricting means may be adapted to restrict or inhibit a specific change of the operation mode, namely, a change of the operation mode from a given or specific one mode to specific another mode.

In a third preferred form of the first aspect of the invention, the hybrid drive system further comprises determining means for determining whether a rate of increase in an output of the drive power source currently desired by an operator of the motor vehicle is higher than a predetermined threshold. In this case, the mode change restricting means is disabled to inhibit the mode selecting means from changing the operation mode when the determining means determines that the rate of increase is higher than said predetermined threshold. When the rate of increase in the currently required output of the drive power source is higher than the threshold, it means that the vehicle operator desires to drive the vehicle with an increased drive force for rapid acceleration of the vehicle. In this case, it is desirable to permit the mode selecting means to select and establish the appropriate operation mode such as the engine•motor drive mode even when the automatic transmission is shifted to change its speed ratio. For instance, the determining means is adapted to determine whether a rate of increase in an operating amount of an accelerator pedal of the motor vehicle is higher than the predetermined threshold.

In a fourth preferred form of this first aspect of the invention, the mode change restricting means is adapted to interrupt the change of the operation mode by the mode selecting means when the speed ratio of the automatic transmission is changed by the shift control means. In this case, the hybrid drive system further comprises means for permitting the mode selecting means to resume the change of the operation mode when the speed ratio of the automatic transmission has been changed by the shift control means.

The first object indicated above may also be achieved according to a second aspect of this invention, which provides a hybrid derive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) an automatic transmission which is disposed between the drive power source and a drive wheel of the motor vehicle and whose speed ratio is variable; (c) mode selecting means for selecting one of the plurality of operation modes, according to a predetermined mode selecting pattern; (d) shift control means for controlling the automatic transmission to change a speed ratio thereof, according to a predetermined shifting pattern; and (e) shifting restricting means for restricting a change of the speed ratio of the automatic transmission when the operation mode is changed by the mode selecting means.

In the vehicle hybrid drive system constructed according to the second aspect of this invention, a change of the speed ratio of the automatic transmission by the shift control means is restricted by the shifting restricting means when the operation mode is changed by the mode selecting means.

Thus, the present hybrid drive system is adapted to minimize or prevent a shifting action of the automatic transmission concurrently with a change of the operation mode.

The hybrid drive system according to the second aspect of the invention, which comprises the shifting restricting means, may use clutches or a synthesizing and distributing mechanism, for selectively establishing the operation modes, or may use the electric motor as an auxiliary drive power source, as described above with respect to the first aspect of the invention. The automatic transmission described above with respect to the first aspect of the invention may be provided in the present hybrid drive system according to the second aspect of the invention.

In one preferred form of the second aspect of the invention, the shifting restricting means includes determining means for determining whether a change of the operation mode by said mode selecting means is completed. In this case, the shifting restricting means inhibits the shift control means from changing the speed ratio of the automatic transmission until the determining means has determined that the change of the operation mode is completed. In this form of the second aspect of the invention, the hybrid drive system further comprises means for permitting the shift control means to change the speed ratio of the automatic transmission after the determining means has determined that the change of the operation mode is completed.

In a second preferred form of the second aspect of the invention, the hybrid drive system further comprises mode change restricting means for restricting a change of the operation mode by the mode selecting means when the speed ratio of the automatic transmission is changed by said shift control means. In this case, the mode change restricting means may include determining means for determining whether a shifting action of the automatic transmission is terminated, so that mode change restricting means interrupts the change of the operation mode until the determining means has determined that the shifting action is terminate. In this case, the hybrid drive system further comprises means for permitting the mode selecting means to resume the change of the operation mode after the determining means has determined that the shifting action is terminated.

In a third preferred form of this second aspect of the invention, the shifting restricting means is adapted to restrict a so-called POWER-DOWN shift-up action of the automatic transmission which takes place when an output of the drive power source currently required by an operator of the motor vehicle is reduced. However, the shifting restricting means may be adapted to restrict or inhibit any specific shifting action of the automatic transmission, for instance, a clutch-to-clutch shifting action as described above with respect to the first aspect of the invention. The shifting restricting means may be adapted to restrict or inhibit shifting actions of the automatic transmission under any operating conditions of the vehicle when the operation mode is changed. The shifting restricting means may be adapted to restrict a shifting action of the automatic transmission only when the operation mode is changed from a given or specific one mode to specific another mode.

The first object indicated above may also be achieved according to a third aspect of this invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) an automatic transmission which is disposed between the drive power source and a drive wheel of the motor vehicle and whose speed ratio is variable; (c) mode selecting means for selecting one of the plurality of operation modes, according to a predetermined mode selecting pattern, the mode selecting boundary line including a mode selecting boundary line used by the mode selecting means for determining whether the operation mode should be changed between one and another of the operation modes; (d) shift control means for controlling the automatic transmission to change a speed ratio thereof, according to a predetermined shifting pattern; and (e) memory means for storing data representative of the predetermined shifting pattern, the predetermined shifting pattern including at least one first shift boundary line used by the shift control means for determining whether the speed ratio of the automatic transmission should be changed in the above-indicated one operation mode, and at least one second shift boundary line used by the shift control means for determining whether the speed ratio of the automatic transmission should be changed in the above-indicated another operation mode. The above-indicated at least one first shift boundary line and the above-indicated at least one second shift boundary line being continuous with each other, at the mode selecting boundary line.

In the hybrid drive system constructed according to the third aspect of the invention, the shift control means uses the predetermined shifting pattern stored in the memory means. This shifting pattern includes at least one first shift boundary line for changing the speed ratio of the automatic transmission when the vehicle is placed in one of the operation modes, and at least one shift boundary line for changing the speed ratio when the vehicle is placed in another operation mode. Each first shift boundary line is made continuous with the corresponding second shift boundary line, at the mode selecting boundary line used for changing the operation mode from the above-indicated one operation mode to the above-indicated another operation mode or vice versa. The use of the continuous first and second shift boundary lines makes it possible to prevent concurrent operations to change the operation mode and the speed ratio of the automatic transmission, as in the hybrid drive system according to the first and second aspect of the invention.

The hybrid drive system according to the third aspect of the invention, which comprises the memory means described above, may use clutches or a synthesizing and distributing mechanism, for selectively establishing the operation modes, or may use the electric motor as an auxiliary drive power source, as described above with respect to the first aspect of the invention. The automatic transmission described above with respect to the first aspect of the invention may be provided in the present hybrid drive system according to the second aspect of the invention.

In one preferred form of the third aspect of this invention, each of the first and second boundary lines of the predetermined shifting pattern represented by the data stored in the memory means represents a relationship between two operating parameters of the motor vehicle and which is used by the shift control means for determining, on the basis of the two operating parameters, whether the automatic transmission should be shifted between two operating positions having respective two different speed ratio values. For instance, the two operating parameters consist of a running speed of the vehicle and an operating amount of the accelerator pedal.

Similarly, the mode selecting boundary line of the predetermined mode selecting pattern may represent a relationship between the two operating parameters of the motor vehicle and which is used by the mode selecting means for determining, on the basis of the two operating parameters, whether the operation mode should be changed from one operation mode to another operation mode or vice versa. Each first shift boundary line and each second shift boundary line intersect the mode selecting boundary line, as indicated in FIG. 11A.

In one advantageous arrangement of the above preferred form of the third aspect of the invention, the above-indicated one operation mode is an engine drive mode in which only the engine is operated as the drive power source, and the above-indicated another operation mode is a motor drive mode in which only the electric motor is operated as the drive power source.

If the first and second boundary lines are determined so as to maximize the energy efficiency minimize the fuel consumption of the engine) of the drive power source, each second shift boundary line for the motor drive mode is generally offset from the corresponding first shift boundary line for the engine drive mode, in the direction in which the running speed of the vehicle increases, as indicated in FIG. 11A. In the light of this fact, the second shift boundary line is preferably offset from the first shift boundary line in the direction in which the vehicle running speed decreases.

Alternatively, the second shift boundary line may be determined such that the second shift boundary line is an extension of the corresponding first shift boundary line which is determined so as to minimize the fuel consumption of the engine, as indicated in FIG. 11B.

The first object indicated above may also be achieved according to a fourth aspect of this invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) a torque distributing mechanism disposed between the drive power source and front and rear drive wheels of the motor vehicle, for distributing a torque to the front and rear drive wheels; (c) mode selecting means for selecting one of the plurality of operation modes, according to a predetermined mode selecting pattern; (d) torque distribution ratio changing means for controlling the torque distributing mechanism to change a ratio of distribution of the torque to the front and rear drive wheels, according to a predetermined torque distributing pattern; and (e) mode change restricting means for restricting a change of the operation mode of the motor vehicle by the mode selecting means when the ratio of distribution of the torque is changed by the torque distribution ratio changing means.

In the vehicle hybrid drive system constructed according to the fourth aspect of this invention, a change of the operation mode by the mode selecting means is restricted by the mode change restricting means when the ratio of torque distribution is changed by the torque distribution ratio changing means. Thus, the present hybrid drive system is adapted to minimize or prevent a change of the operation mode concurrently with a change of the torque distribution ratio, thereby minimizing or preventing a shock due to a torque variation which would occur if the operation mode were changed during a change of the torque distribution ratio.

The hybrid drive system according to the fourth aspect of the invention, which comprises the mode change restricting means, may use clutches or a synthesizing and distributing mechanism, for selectively establishing the operation modes, or may use the electric motor as an auxiliary drive power source, as described above with respect to the first aspect of the invention.

The torque distributing mechanism may be a center differential device disposed between the drive power source and the front and rear drive wheels. The center differential device may include a planetary gear mechanism including three rotary elements rotatable relative to each other and a differential limiting clutch which connect two elements of the three rotary elements to each other. The ratio of torque distribution to the front drive wheels and the rear drive wheels can be suitably adjusted by controlling the engaging force of the differential limiting clutch. Alternatively, the torque distributing mechanism may be a differential device of bevel gear type, or may use a clutch which is used for a stand-by 4-wheel drive motor vehicle, for controlling power transmission between the front and rear drive wheels. The torque of the clutch may be continuously controlled, or the clutch may be merely selectively engaged and disengaged. The above-indicated predetermined torque distributing pattern may be a data map including suitable operating parameters of the vehicle such as a yaw rate, a steering angle and a running speed of the vehicle.

In one preferred form of the fourth aspect of the invention, the mode change restricting means includes determining means for determining whether a change of the ratio of distribution of the torque by the torque distribution ratio changing means is terminated. In this case, the mode change restricting means inhibits the mode selecting means from changing the operation mode until the determining means has determined that the change of the ratio of distribution of the torque is terminated. In this form of the invention, the hybrid drive system further comprises means for permitting the mode selecting means to change the operation mode after the determining means has determined that the change of the ratio of distribution of the torque is terminated. However, if a determination by the mode selecting means that the operation mode should be changed from one operation mode to another is made prior to the initiation of a change of the torque distribution ratio, this change of the torque distribution ratio may be deferred so that the operation mode is first changed, and the torque distribution ratio is then initiated.

In a second preferred form of the fourth aspect of the invention, the hybrid drive system further comprises determining means for determining whether a rate of increase in an output of the drive power source currently desired by an operator of the motor vehicle is higher than a predetermined threshold, and the mode change restricting means is disabled to inhibit the mode selecting means from changing the operation mode when the determining means determines that the rate of increase in the currently required output of the motor vehicle is higher than the predetermined threshold. The determining means may be adapted to determine whether a rate of increase in an operating amount of an accelerator pedal of the motor vehicle is higher than the predetermined threshold.

The mode change restricting means according to the fourth aspect of the invention may be adapted to inhibit a change of the operation mode under any operating condition of the vehicle when the torque distribution ratio is changed. Further, the mode change restricting means may be adapted to restrict or inhibit a specific change of the operation mode, namely, a change of the operation mode from a given or specific one mode to specific another mode.

The first object may also be achieved according to a fifth aspect of the present invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) a torque distributing mechanism disposed between the drive power source and front and rear drive wheels of the motor vehicle, for distributing a torque to the front and rear drive wheels; (c) mode selecting means for selecting one of the plurality of operation modes, according to a predetermined mode selecting pattern; (d) torque distribution ratio changing means for controlling the torque distributing mechanism to change a ratio of distribution of the torque to the front and rear drive wheels, according to a predetermined torque distributing pattern; and (e) torque distribution ratio change restricting means for restricting a change of the ratio of distribution of the torque by the torque distribution ratio changing means when the operation mode is changed by the mode selecting means means.

In the vehicle hybrid drive system constructed according to the fifth aspect of this invention, a change of the ratio of distribution of the torque to the front and rear drive wheels is restricted by the torque distribution ratio change restricting means when the operation mode is changed by the mode selecting means. Thus, the present hybrid drive system is adapted to minimize or prevent a change of the torque distribution ratio concurrently with a change of the torque distribution ratio, thereby minimizing or preventing a shock due to a torque variation which would occur if the torque distribution were changed during a change of the operation mode.

The hybrid drive system according to the fifth aspect of the invention, which comprises the torque distribution ratio change restricting means, may use clutches or a synthesizing and distributing mechanism, for selectively establishing the operation modes, or may use the electric motor as an auxiliary drive power source, as described above with respect to the first aspect of the invention.

In one preferred form of the fifth aspect of this invention, the torque distribution ratio change restricting means includes determining means for determining whether a change of the operation mode by the mode selecting means is terminated. In this case, the torque distribution ratio change restricting means inhibits the torque distribution ratio changing means from changing the ratio of distribution of the torque until the determining means has determined that the change of the operation mode is terminated. In this form of the invention, the hybrid drive system further comprises means for permitting the torque distribution ratio changing means to change the ratio of distribution of the torque after the determining means has determined that the change of the operation mode is terminated.

In a second preferred form of this fifth aspect of the invention, the hybrid drive system further comprises mode change restricting means for restricting a change of the operation mode by the mode selecting means when the ratio of distribution of the torque is changed by the torque distribution ratio changing means. In this case, the mode change restricting means may include determining means for determining whether a change of the ratio of distribution of the torque is terminated. In this instance, the mode change restricting means is adapted to interrupt the change of the operation mode until the determining means has determined that the change of the ratio of distribution of the torque is terminated, and the hybrid drive system further comprises means for permitting the mode selecting means to resume the change of the operation mode after the determining means has determined that the change of the ratio of distribution of the torque is terminated.

The torque distribution ratio change restricting means according to the fifth aspect of the invention may be adapted to inhibit a change of the torque distribution ratio under any operating condition of the vehicle when the operation mode is changed. However, the torque distribution ratio change restricting means may be adapted to restrict or inhibit a change of the torque distribution ratio under a specific operating condition of the vehicle, for example, when the torque distribution ratio of the front and rear drive wheels should be changed rapidly in the presence of a considerably large speed difference of the front and rear drive wheels. The torque distribution ratio change restricting means may be adapted to restrict a change of the torque distribution ratio only when the operation mode is changed from a given or specific one mode to specific another mode.

The second object indicated above may be achieved according to a sixth aspect of the present invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) mode selecting means for selecting one of the plurality of operation modes, according to a predetermined mode selecting pattern; (c) a power transmitting device disposed between the drive power source and a drive wheel of the motor vehicle, the power transmitting device having a non-drive state and a drive state; (d) manually operated transmission switching means for switching the power transmitting device between the non-drive and non-drive states; and (e) mode change restricting means for restricting a change of the operation mode of the motor vehicle by the mode selecting means when the power transmitting device is switched from the non-drive state to the drive state, by the manually operated transmission switching means.

In the hybrid drive system constructed as described above according to the sixth aspect of this invention, a change of the operation mode is restricted when the power transmitting device is switched from the non-drive state to the drive state, thereby minimizing or preventing a variation in the output of the drive power source due to a change of the operation mode, whereby the power transmitting device can be smoothly switched from the non-drive state to the drive state, with a reduced shifting shock.

The present hybrid drive system including the engine and the electric motor as the drive power source and the mode change restricting means may be adapted such that the different operation modes are selectively established by selective engagement and disengagement of clutches for selective connection and disconnection of the engine and electric motor to and from the power transmitting device, or by a synthesizing and distributing mechanism such as a planetary gear mechanism adapted to synthesize and distribute the outputs of the engine and electric motor. Alternatively, the hybrid drive system may be arranged such that the engine is used as a primary drive power source while the electric motor is used as an auxiliary drive power source. The operation modes may include an engine drive mode in which only the engine is used as the drive power source for driving the vehicle, a motor drive mode in which only the electric motor is used as the drive power source, and an engine•motor drive mode in which both the engine and the electric motor are used as the drive power source. An appropriate one of the operation modes is selected on the basis of suitable operating parameters of the motor vehicle such as the currently required output of the drive power source (as represented by the operating amount of the accelerator pedal), vehicle running speed and the electric energy amount stored in a suitable electric energy storage device, and according to a predetermined mode selecting pattern as represented by a stored data map.

The power transmitting device may be an automatic transmission which is switched from the non-drive state to the drive state and automatically shifted to one of different gear positions in the drive state, by hydraulically operated frictional coupling devices such as hydraulic clutches and brakes. However, the power transmitting device may be a continuously variable transmission or a manually operated transmission. The manually transmission switching means may be a combination of a manually operated member such as a shift lever and a manual shift valve which is mechanically connected to the manually operated member and which is adapted to control a hydraulic circuit for controlling the power transmitting device.

In one preferred form of the sixth aspect of the invention, the manually operated transmission switching means includes a manually operated shift lever, and a manual shift valve mechanically connected to the shift lever for selectively placing the power transmitting device in the non-drive state and the drive state.

In another preferred form of the sixth aspect of the invention, the hybrid drive system further comprises determining means for determining whether the power transmitting device has been switched from the non-drive state to the drive state. In this case, the mode change restricting means inhibits a change of the operation mode until the determining means has determined that the power transmitting device has been switched to the drive state. In this form of the invention, the hybrid drive system further includes means for permitting the change of the operation mode after the power transmitting device has been switched to the drive state.

The second object indicated above may also be achieved according to a seventh aspect of this invention, which provides a hybrid drive system for a motor vehicle, comprising: (a) a drive power source including an engine operated by combustion of a fuel, and an electric motor operated with an electric energy, at least one of said engine and said electric motor being operated for driving the motor vehicle in a plurality of operation modes; (b) mode selecting means for selecting one of said plurality of operation modes, according to a predetermined mode selecting pattern; (c) a power transmitting device disposed between said drive power source and a drive wheel of the motor vehicle, said power transmitting device having a non-drive state and a drive state; (d) manually operated transmission switching means for switching said power transmitting device between said non-drive and non-drive states; and (e) input cutting means for cutting a power transfer from said drive power source to said power transmitting device when the power transmitting device is switched from said non-drive state to said drive state, by said manually operated transmission switching means.

In the hybrid drive system constructed as described above according to the seventh aspect of this invention, the power transfer from the drive power source to the power transmitting device is cut by the input cutting means when the power transmitting device is switched from the non-drive state to the drive state. Therefore, the power transmitting device can be smoothly switched to the drive state with a reduced shifting shock, even in the presence of a variation in the output of the drive power source due to a change in the operating amount of the accelerator pedal and a change of the operation mode.

In the hybrid drive system including the input cutting means according to the seventh aspect of the invention, the power transmitting device and the transmission switching means may be arranged as described above with respect to the seventh aspect of the invention.

In a first preferred form of the seventh aspect of this invention, the plurality of operation modes include an engine drive mode in which only the engine is operated to drive the motor vehicle, and hybrid drive system further comprising a synthesizing and distributing mechanism having a first rotary element connected to the engine, a second rotary element connected to the electric motor, and a third rotary element connected to the power transmitting device. In this case, the input cutting means is operable when the engine drive mode is selected, to place the electric motor in a non-load state in which the electric motor is freely rotatable, whereby the power transfer from said engine to said power transmitting device is cut by said input cutting means when said engine drive mode is selected.

In a second preferred form of the seventh aspect of the invention, the manually operated transmission switching means includes a manually operated shift lever, and a manual shift valve mechanically connected to the shift lever for selectively placing the power transmitting device in the non-drive state and said drive state.

In a third preferred form of the seventh aspect of the invention, the hybrid drive system further comprises determining means for determining whether the power transmitting device has been switched from the non-drive state to the drive state. In this case, the input cutting means is adapted to cut the power transfer until the determining means has determined that the power transmitting device has been switched to the drive state. In this form of the invention, the hybrid drive system further includes means for permitting the power transfer from the drive power source to the power transmitting device after the power transmitting device has been switched to the drive state.

The second object indicated above may also be achieved according to an eighth aspect of this invention, which provides a hybrid drive system for a motor vehicle, comprising: (a) a drive power source including an engine operated by combustion of a fuel, and an electric motor operated with an electric energy, at least one of the engine and the electric motor being operated for driving the motor vehicle in a plurality of operation modes; (b) mode selecting means for selecting one of the plurality of operation modes, according to a predetermined mode selecting pattern; (c) a power transmitting device disposed between the drive power source and a drive wheel of the motor vehicle, the power transmitting device having a non-drive state and a drive state; (d) manually operated transmission switching means for switching the power transmitting device between the non-drive and non-drive states; and (e) output control means for holding an output of the drive power source substantially constant while the power transmitting device is switched from the non-drive state to the drive state by the manually operated transmission switching means.

In the hybrid drive system according to the eighth aspect of the present invention described above, the output of the drive power source is held substantially constant while the power transmitting device is switched from the non-drive state to the drive state, whereby the power transmitting device can be smoothly switched to the drive state, with a reduced shifting shock.

In the hybrid drive system including the output control means according to the eighth aspect of the invention, the power transmitting device and the transmission switching means may be arranged as described above with respect to the seventh aspect of the invention.

In one preferred form of the eighth aspect of the invention, the manually operated transmission switching means includes a manually operated shift lever, and a manual shift valve mechanically connected to the shift lever for selectively placing the power transmitting device in the non-drive state and the drive state.

In a second preferred form of the eighth aspect of the invention, the hybrid drive system further comprises determining means for determining whether the power transmitting device has been switched from the non-drive state to the drive state, and the output control means is adapted to hold the output of the drive power source substantially constant until the determining means has determined that the power transmitting device has been switched to the drive state. The hybrid drive system further includes means for permitting the output of the drive power source to be changed after the power transmitting device has been switched to the drive state.

The output control means may be arranged to hold the output of the engine and/or the electric motor substantially constant, irrespective of a change in the operating amount of the accelerator pedal, for example. The output control means may be adapted such that the output of the engine in the engine drive mode is permitted to change with a change in the operating amount of the accelerator pedal, while the output of the electric motor is controlled so as to offset a change of the output of the engine, so that the overall output of the drive power source is held substantially constant.

The hybrid drive system according to the sixth aspect of the invention described above may preferably further comprise the output control means according to the eighth aspect of the invention. However, the hybrid drive system according to the sixth aspect of the invention adapted to inhibit a change of the operation mode upon switching of the power transmitting device to the drive state may be adapted to permit the outputs of the engine and electric motor to change depending upon the operating amount of the accelerator pedal. Similarly, the hybrid drive system according to the seventh aspect of the invention adapted to cut the power transfer upon switching of the power transmitting device to the drive state may be arranged to permit the outputs of the engine and electric motor to change with the operating amount of the accelerator pedal.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 9 is a view indicating nine operating modes which are selectively established in the sub-routine of FIG. 8;

FIG. 17 is a view indicating the operating states of the coupling elements for establishing different operating positions of an automatic transmission in the hybrid drive system of FIG. 16;

FIG. 24 is a view indicating operating states of coupling elements for establishing different operating positions of an automatic transmission in the hybrid drive system of FIG. 23.

DETAILED DESCRIPTION OF THE PREFERRED EMBODIMENTS

Figure 1:
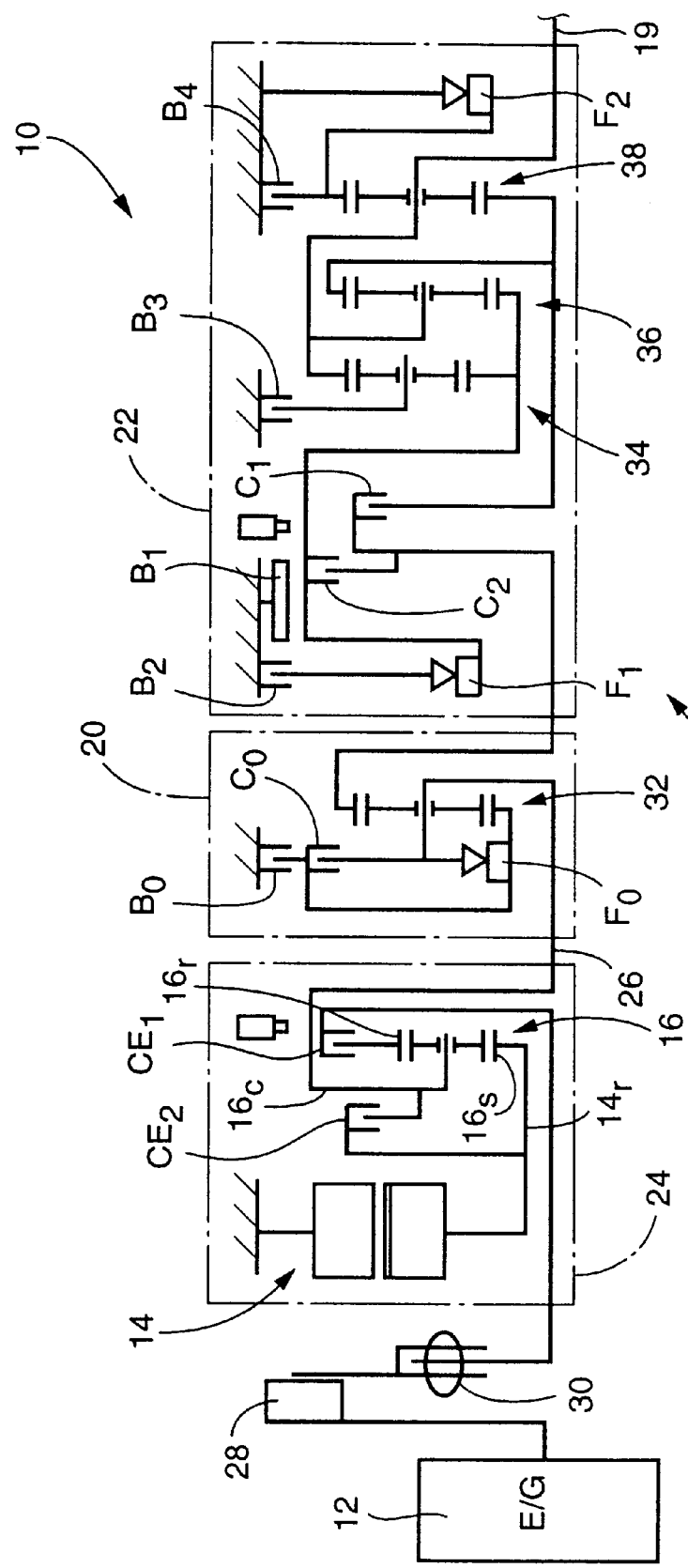
FIG. 1 is a schematic view illustrating a general arrangement of a hybrid drive system constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The automatic transmission 18 functions as a power transmitting device disposed between the drive power source (12, 14) and the drive wheel of the vehicle.

The auxiliary transmission 20 includes frictionally coupling clutch C0 and brake B0 operated by respective hydraulic actuators, and a one-way clutch F0. The primary transmission 22 frictionally coupling clutches C1, C2 and brakes B1, B2, B3, B4 which are operated by respective hydraulic actuators, and one-way clutches F1, F2.

Figure 2:
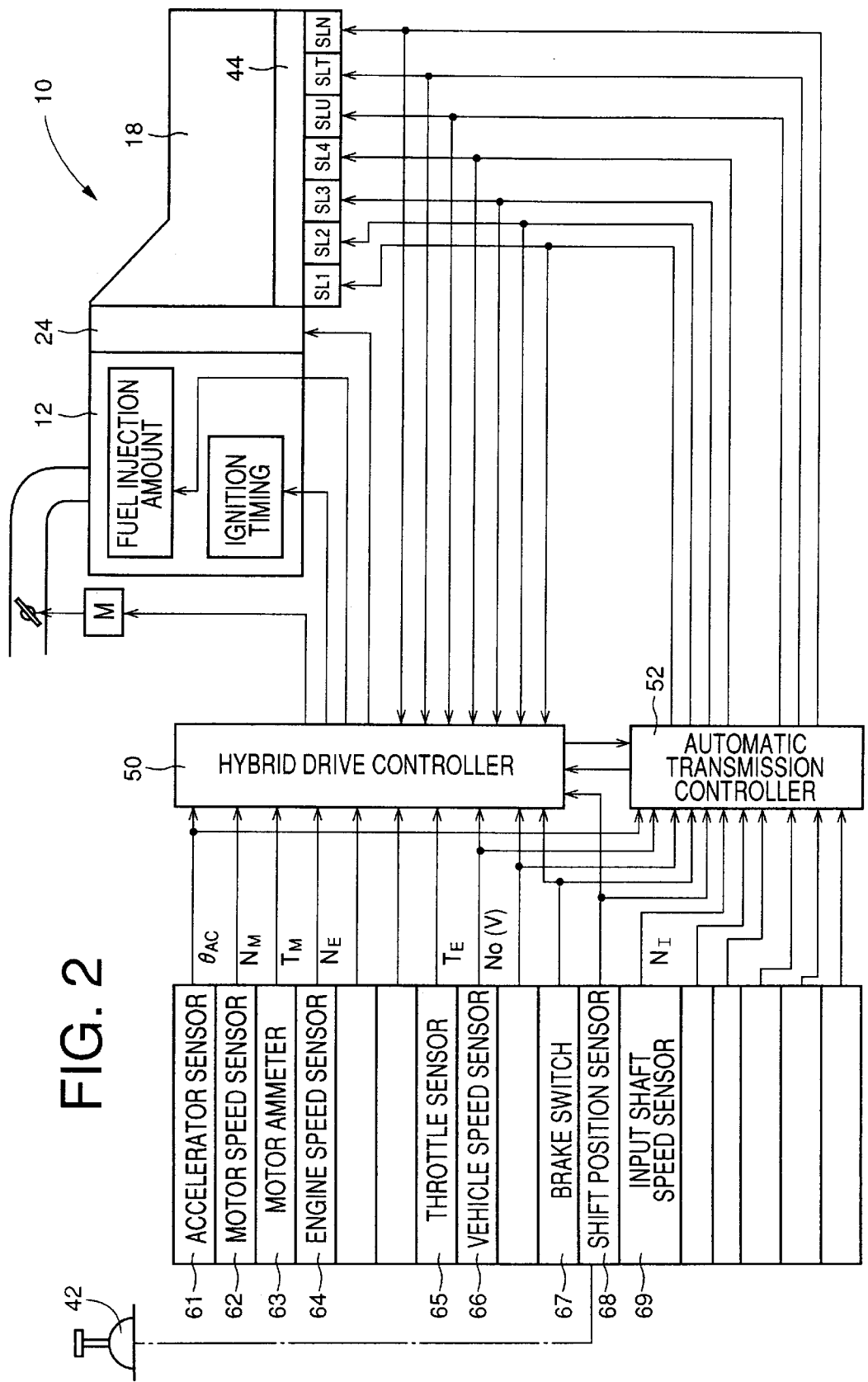
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve 41 which is mechanically connected through a push-pull cable 43 to a shift lever 42. The clutches C0–C2 and brakes B0–B4 are controlled by the solenoid-operated valves SL1–SL4 and the manual shift valve 41. The shift lever 42 has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral position "N", rear-drive position "Rev" and engine braking positions of the automatic transmission 18 are established by movements of the manual shift valve 41 mechanically connected to the shift lever 42. When the shift lever 42 is placed in the drive position "D", the automatic transmission 18 is automatically shifted to an appropriate one of the five forward-drive positions "1st" through "5th", with the solenoids of the solenoid-operated valves SL1–SL4 being selectively energized depending upon the running condition of the vehicle.

The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $1/(1+\rho)$.

The rear-drive position "Rev" of the automatic transmission 18 has a speed ratio $i_R$ which is equal to $1-1/\rho_2 \cdot \rho_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

Figure 4:
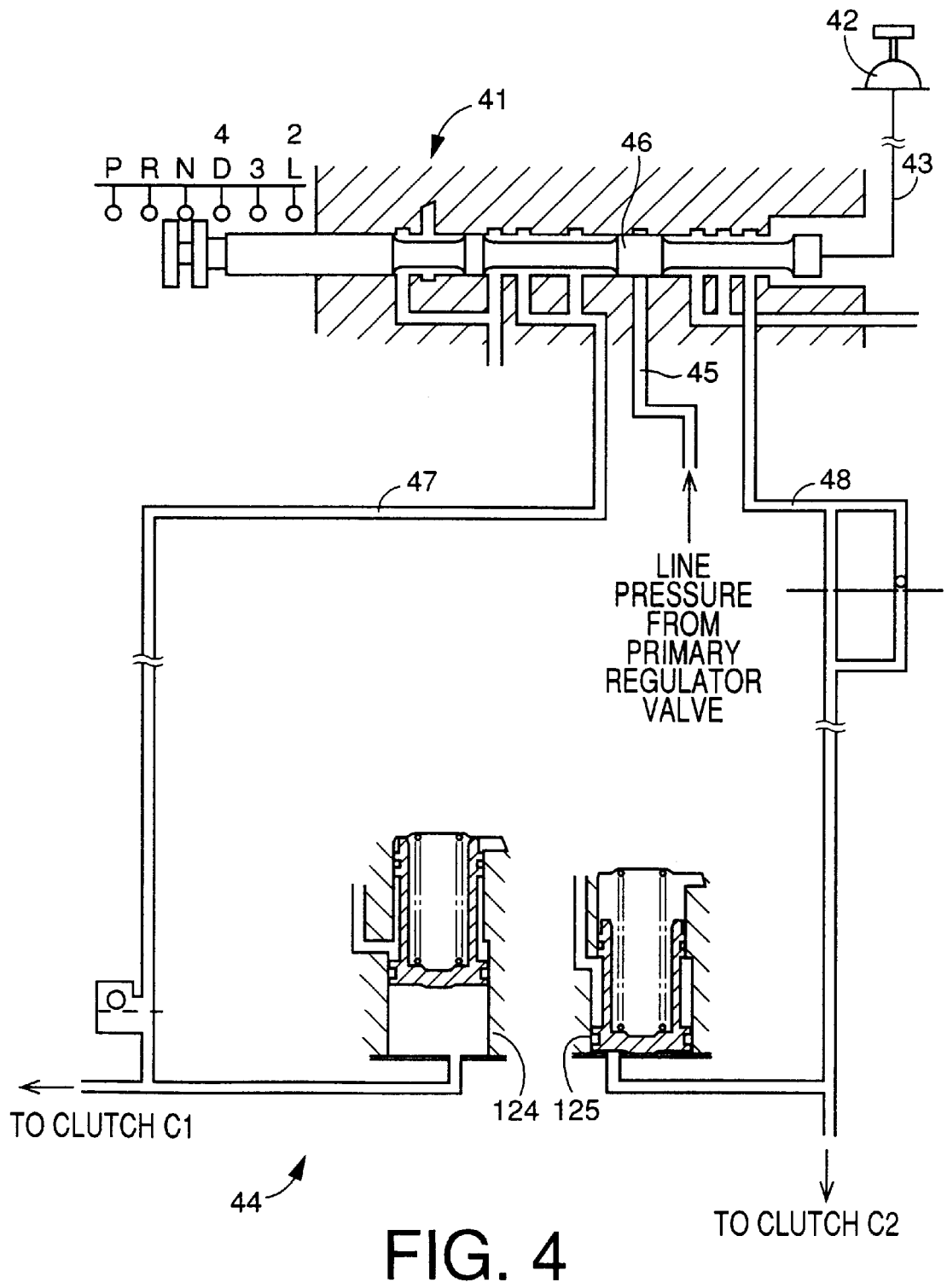
FIG. 4 is a view showing an example of a manual shift valve mechanically connected to a shift lever shown in FIG. 2.

An example of the manual shift valve 41 mechanically connected to the shift lever 42 is shown in FIG. 4. The manual shift valve 41 receives through a fluid passage 45 a line pressure from a primary regulator valve (not shown). When the shift lever 42 is placed the neutral or parking position "N", "P", a spool 46 disconnects the fluid passage 45 from a fluid passage 47 and a fluid passage 48, the fluid pressure is not applied to the clutches C1, C2, whereby the automatic transmission 18 is mechanically placed in the neutral position "N".

When the shift lever 42 is operated to the drive position "D" or any one of the engine braking positions, the spool 46 is moved to connect the fluid passage 45 to the fluid passage 47, whereby the clutch C1 (forward drive clutch) is activated by the hydraulic pressure to mechanically bring the automatic transmission 18 to a forward drive state. When the shift lever 42 is operated to the reverse position "R", the spool 46 is moved to connect the fluid passage 45 to the fluid passage 48, whereby the clutch C2 (direct drive clutch) is activated by the hydraulic pressure to mechanically bring the automatic transmission 18 to a rear drive state. Clutches C1, C2 are connected to respective accumulators 125, 126.

Figure 5:
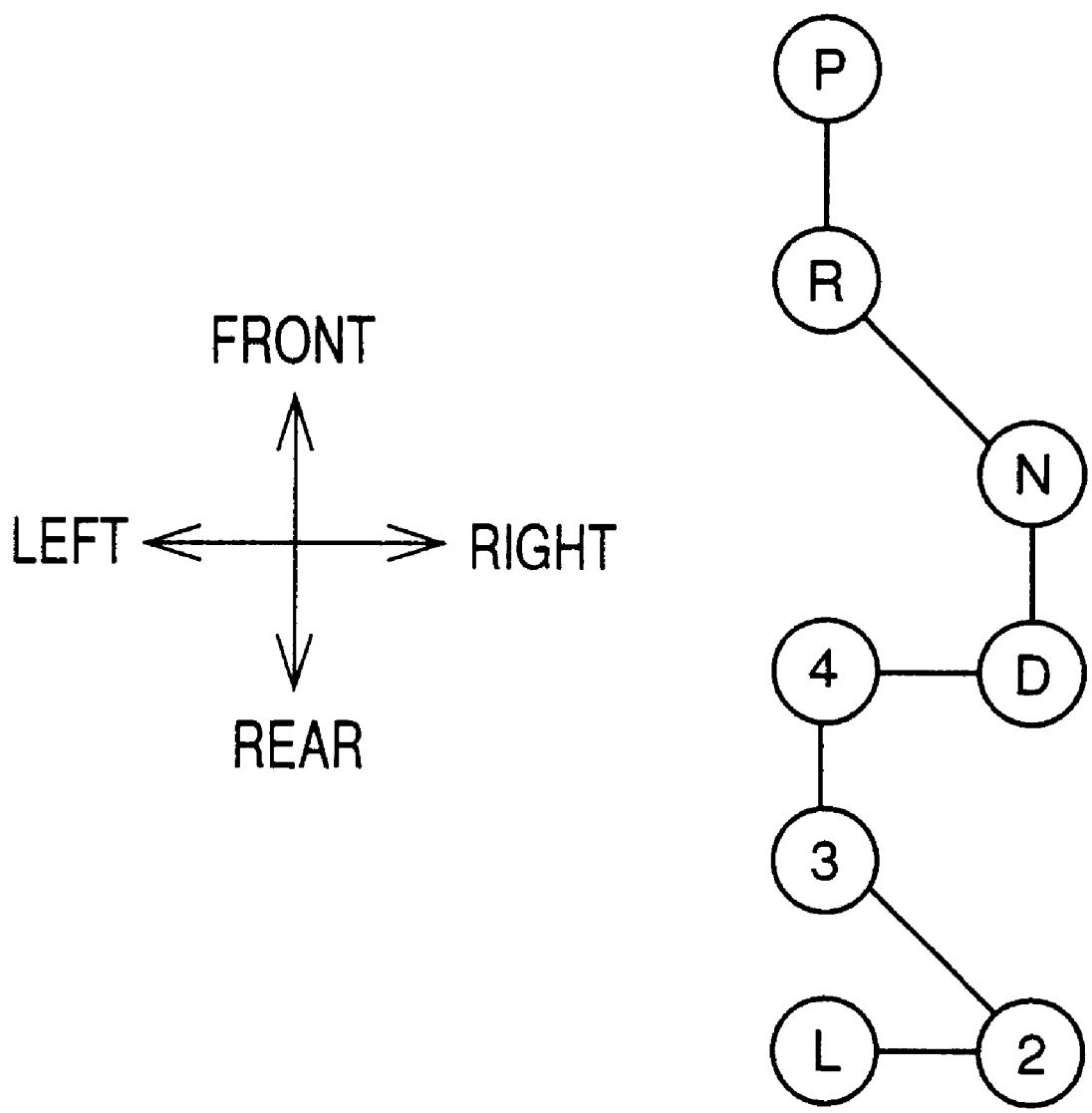
FIG. 5 is a view indicating operating positions of the shift lever.

Referring to FIG. 5, there are shown the operating positions of the shift lever 42. That is, the shift lever 42 has six positions arranged in the longitudinal or running direction of the vehicle, and two positions arranged in the transverse or lateral direction of the vehicle. The shift lever 42 is supported by a suitable support device such that the shift lever 42 is operable to the eight operating positions, namely, parking position "P", reverse position "R", neutral position "N", drive position "D", fourth-speed position "4", and engine braking positions "3", "2", "L". The six positions arranged in the longitudinal direction correspond to the six positions of the spool 46 of the manual shift valve 41 indicated in FIG. 4. It will be understood that the manual shift valve 41 and the shift lever 42 constitute manually operated transmission switching means for switching the power transmitting device in the form of the automatic transmission 18 between a driving state and a non-driving state. When the shift lever 42 is placed in one of the parking and neutral positions, the automatic transmission 18 is placed in the non-driving state. When the shift lever 42 is placed in one of the reverse position "R", drive position "D" and engine braking positions "3", "2" and "L", the automatic transmission 18 is placed in the driving state.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 44 is constructed as described below by reference to FIG. 6.

Figure 6:
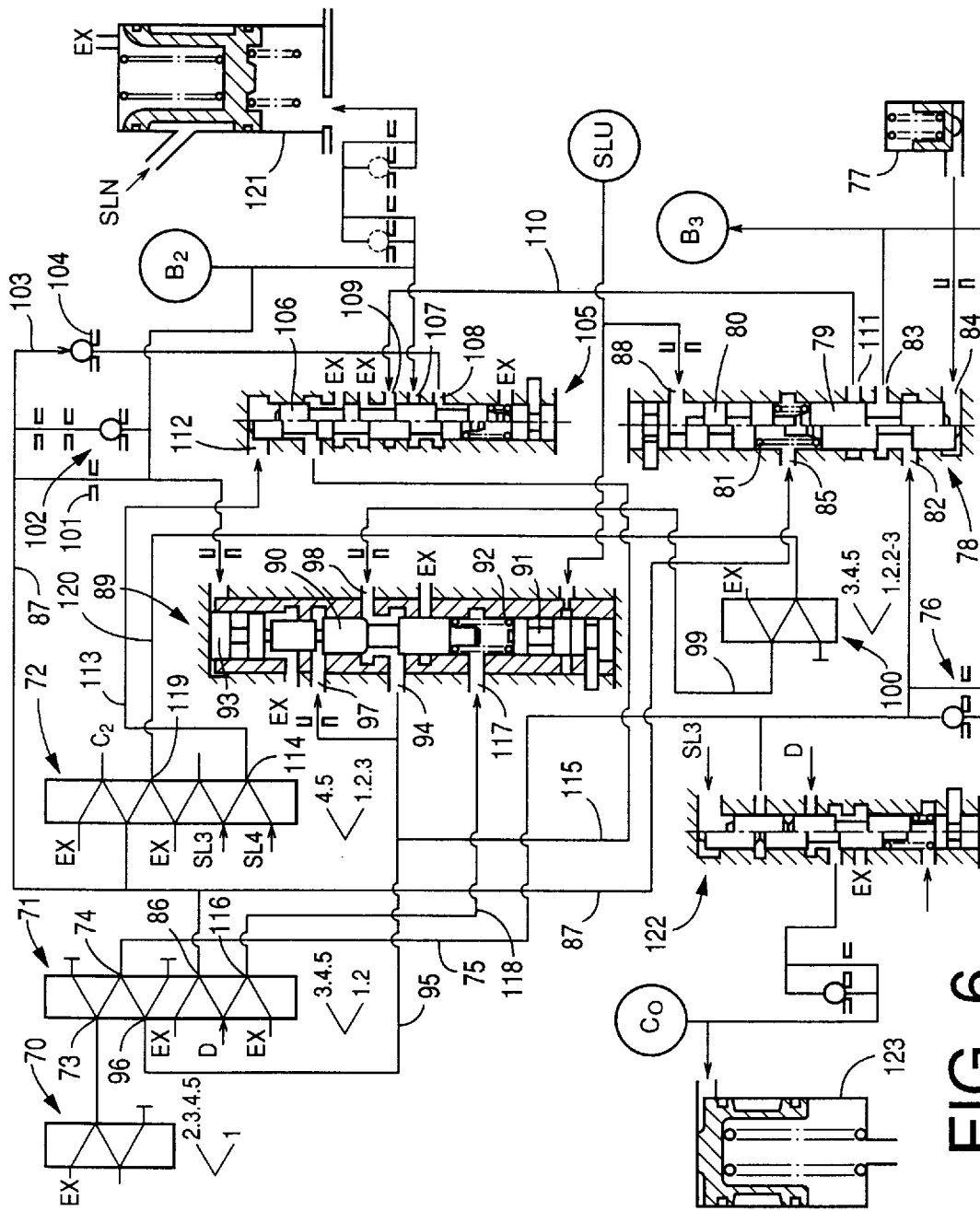
FIG. 6 is a view showing a part of a hydraulic system of the automatic transmission in the hybrid drive system of FIG. 1.

In FIG. 6, reference numerals 70, 71 and 72 denote a 1–2 shift valve, a 2–3 shift valve and a 3–4 shift valve, respectively. Working fluid communications of ports of these shift valves 70, 71, 72 are indicated below the shift valves as shown in FIG. 6 in which the five forward-drive positions "1st", "2nd", "3rd", "4th" and "5th" are represented as "1", "2", "3", "4" and "5", respectively.

The 2–3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 6 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 81 is disposed. The 2–3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 6 denotes a 2–3 timing valve which includes a spool 90, a first plunger 91, a spring 92 disposed between the spool 90 and the first plunger 91, and a second plunger 93 disposed on the side of the spool 90 remote from the first plunger 91. The spool 90 has a small-diameter land and two large-diameter lands having a larger diameter than the small-diameter land. The 2–3 timing valve 89 has a port 94 formed at an intermediate portion thereof. An oil passage 95 is connected to the port 94, and to a port 96 of the 2–3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2–3 timing valve 89, which port 97 is open between the above-indicated small-diameter land one of the two large-diameter lands of the spool 90. The 2–3 timing valve 89 further has a port 98 which is selectively communicable with the above-indicated port 94 and which is connected through an oil passage 99 to a solenoid relay valve 100.

The 2–3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 104 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 6. The above-indicated branch 103 of the oil passage 87 is connected to the port 108. The orifice control valve 105 further has a port 08 formed at a position above the port 107 as seen in FIG. 6.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3–4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2–3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 117 of the 2–3 timing valve 89 which is open to a chamber in which the spring 92 is disposed. The 3–4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 6 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases.

Reference numeral 122 in FIG. 6 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, the engaging pressure of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 6, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure of the third brake B3 during its releasing action is controlled by the linear solenoid valve SLU on the basis of an input torque of the input shaft 26 of the automatic transmission 18 which is estimated prior to the shift-up action.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting speed $N_O$ of the output shaft 19 of the automatic transmission 18, which indicates running speed V of the motor vehicle; a brake switch 67 for detecting an operation of a brake pedal; a shift position sensor 68 for detecting the currently selected position of the shift lever; and an input shaft speed sensor 69 for detecting speed $N_I$ of the input shaft 26 of the automatic transmission 18.

While the torque $T_E$ of the engine 12 can be obtained from the throttle opening angle, as indicated above, it may also be obtained from the amount of fuel injection into the engine 12.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 7:
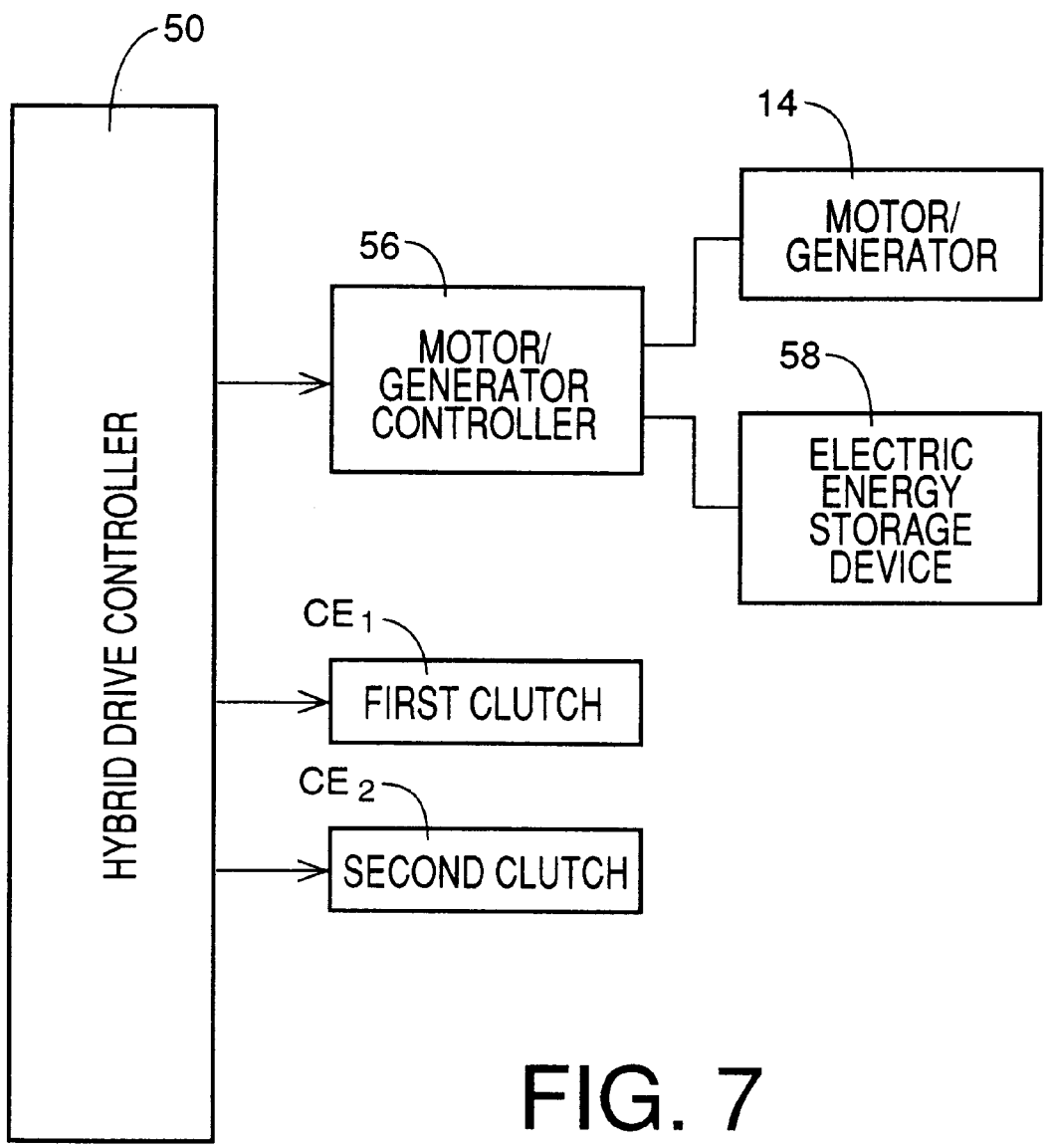
FIG. 7 is a block diagram showing connection between a hybrid drive controller shown in FIG. 2 and an electrically operated torque converter shown in FIG. 1.

The motor/generator 14 is connected to an electric energy storage device 58 through a motor/generator controller 56, as indicated in FIG. 7. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 14 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

An amount of electric energy SOC stored in the electric energy storage device 58 can be obtained from the electric current or charging efficiency of the motor/generator 14 when it is operated as the electric generator to charge the storage device 58.

The first and second clutches CE1, CE2 are controlled by the hybrid drive controllers 50 through solenoid-operated valves of the hydraulic circuit. The automatic transmission 18 is controlled by the automatic transmission controller 252 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns.

Figure 8:
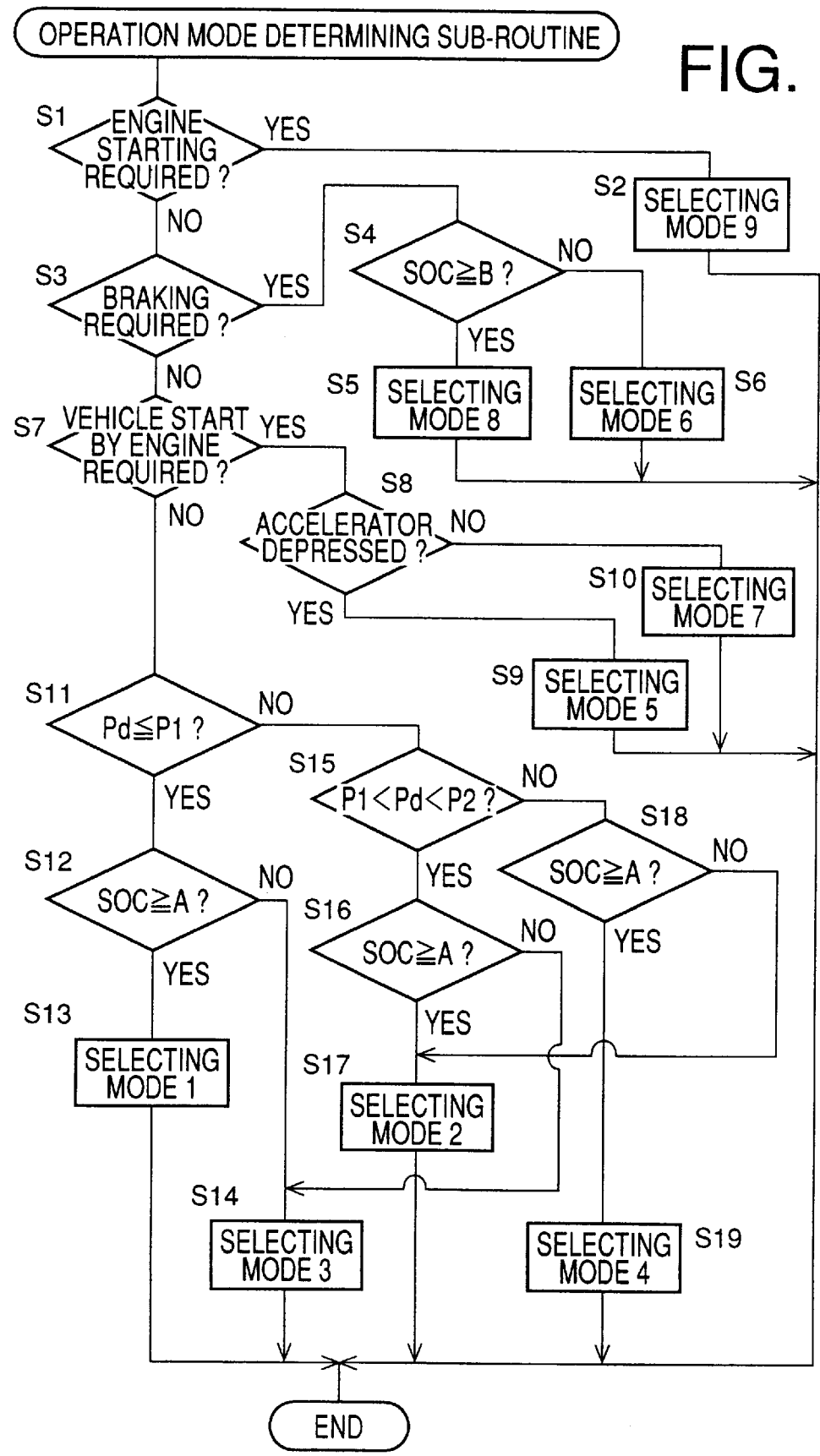
FIG. 8 is a flow chart illustrating an operation mode determining sub-routine executed by the hybrid drive controller.

The hybrid drive controller 50 is adapted to execute an operation mode determining sub-routine illustrated in the flow chart of FIG. 8, for selecting one of nine operation modes of the hybrid drive system 10 indicated in FIG. 9, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above. The hybrid drive controller 50 adapted to execute the operation mode determining sub-routine of FIG. 8 functions as mode selecting means for selecting one of a plurality of operation or running modes of the motor vehicle.

The operation mode determining sub-routine of FIG. 8 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 9, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step s3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 9, and the motor/generator 14 is placed in the NON-LOAD state. Further, the engine 12 is turned OFF, that is, the throttle valve is closed, and the fuel injection amount is zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 14 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 12 is turned OFF, and the motor/generator 14 is placed in the CHARGING state, as indicated in the table of FIG. 9, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 12 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 9, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1: $(1+\rho E)$: $\rho E$, where $\rho E$ represents a gear ratio of the planetary gear device 16 ($\rho$=number of teeth of the sun gear 16s divided by number of teeth of the ring gear 16r). When the gear ratio $\rho E$ is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as $(1+\rho E)/\rho E$ times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is $(1+\rho)$ times the engine torque $T_E$.

The motor/generator 14 used in the hybrid drive system 10 of the present embodiment has a torque capacity which is about $\rho E$ times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 9. In this operation mode 7, the output of the carrier 16c is zeroed with the rotor shaft 14r of the motor/generator 14 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 10 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 9, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 9, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 9, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 9, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

Figure 10:
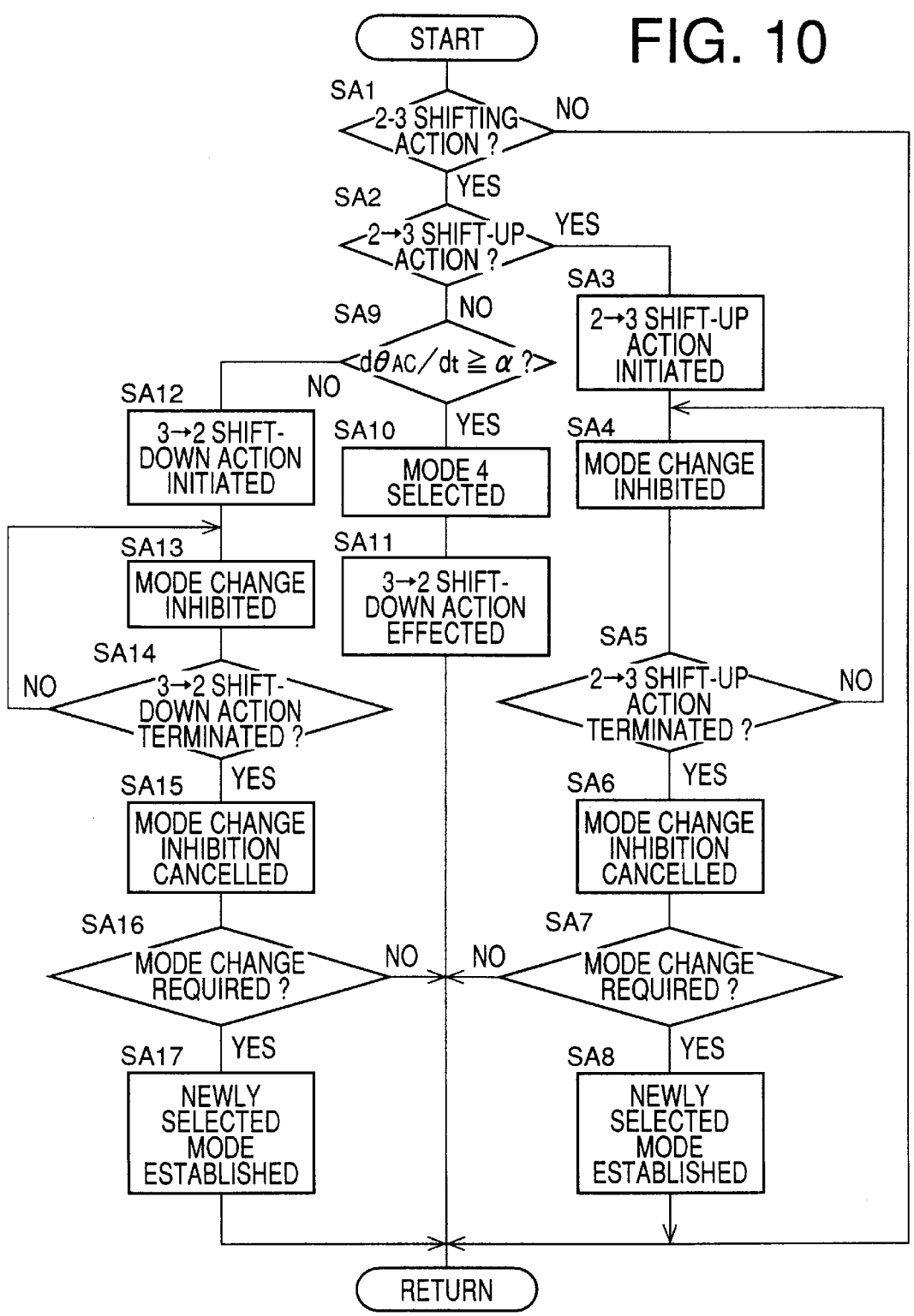
FIG. 10 is a flow chart illustrating a routine executed according to the first embodiment of the invention.

The hybrid drive controller 50 and the automatic transmission controller 52 are adapted to execute a routine illustrated in the flow chart of FIG. 10, for controlling the hybrid drive system so as to minimize a shock upon shifting of the automatic transmission 18. It will be understood from the following explanation that a portion of the automatic transmission controller 52 assigned to implement steps SA3, SA11 and SA12 of the routine of FIG. 10 constitutes shift control means for changing the speed ratio of the transmission 18, while a portion of the hybrid drive controller 50 assigned to implement steps SA8, SA10 and SA17 constitutes mode selecting means for selecting one of a plurality of operation modes of the hybrid drive system 10. It will also be understood that a portion of the hybrid drive controller 50 assigned to implement steps SA4, SA5 and SA13–SA14 constitutes mode change restricting means for restricting a change of the operation mode by the mode selecting means.

Figure 11A:
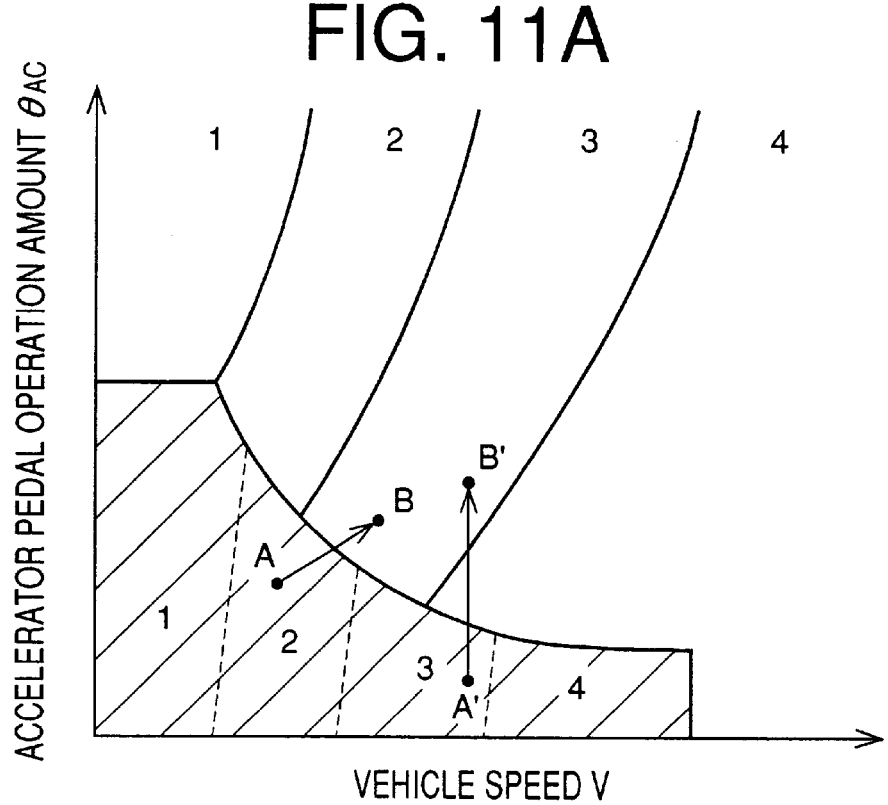
FIG. 11A and FIG. 11B are graphs showing transmission shifting and mode selecting data maps, which include operating amount $\theta_{AC}$ of accelerator pedal and vehicle running speed V as operating parameters of the vehicle and which are used in the routine of FIG. 10 and a routine of FIG. 12.

The routine of FIG. 10 is initiated with step SA1 to determine whether the automatic transmission 18 should be shifted from the second-speed position to the third-speed position or vice versa. This determination is effected on the basis of the detected operating amount $\theta_{AC}$ of the accelerator pedal and vehicle running speed V and according to predetermined shift boundary lines as indicated in FIG. 11A, which are represented by a transmission shifting and mode selecting data map stored in the ROM of the hybrid drive controller 50 and the automatic transmission controller 52. More specifically explained, a determination is made as to whether the current running condition of the vehicle as represented by $\theta_{AC}$ and V is moved across a 2–3 shift boundary line. The operating amount $\theta_{AC}$ of the accelerator pedal is represented by the output signal of the accelerator sensor 61, and the vehicle speed V is represented by the vehicle speed sensor 66.

In the transmission shifting and mode selecting data map, the shift boundary lines are determined so as to maximize the energy efficiency (minimize the fuel consumption) for each of the engine drive mode and the motor drive mode. Accordingly, the shift boundary lines (broken lines) for the motor drive mode indicated by the hatched area in FIG. 11A and the shift boundary lines (solid lines) for the engine drive mode indicated by the non-hatched area in FIG. 11A are not continuous with each other, at the mode selecting boundary line between the hatched motor drive mode area and the non-hatched engine drive mode area.

If a negative decision (NO) is obtained in step SA1, it means that the automatic transmission 18 is not required to effect a clutch-to-clutch shifting action whose control is considerably difficult. In this case, one cycle of execution of the routine of FIG. 10 is terminated, and the operation mode is selected and established according to the operation mode determining sub-routine of FIG. 8 described above. If an affirmative decision (YES) is obtained in step SA1, the control flow goes to step SA2 to determine whether the automatic transmission 18 is required to be shifted up from the second-speed position to the third-speed position.

If an affirmative decision (YES) is obtained in step SA2, the control flow goes to step SA3 in which the 2→3 shift-up action of the automatic transmission 18 from the second-speed position to the third-speed position is initiated, with the solenoid-operated valves SL1–SL3 being suitably energized and deenergized.

Step SA3 is followed by step SA4 to temporarily inhibit a change of the operation mode, namely, to interrupt the execution of the operation mode determining sub-routine of FIG. 8 by the hybrid drive controller 50, even if the operating amount $\theta_{AC}$ of the accelerator pedal and/or the vehicle running speed V is/are considerably changed.

Step SA4 is followed by step SA5 to determine whether the 2→3 shift-up action of the automatic transmission 18 is terminated. This determination may be effected by determining whether the speed $N_I$ of the input shaft 26 of the automatic transmission 18 has become substantially equal to the speed $N_O$ of the output shaft 19 multiplied by the speed ratio of the third-speed position of the automatic transmission 18. Alternatively, the determination may be made by determining whether a time sufficient for the automatic transmission 18 to be shifted from the second-speed position to the third-speed position has elapsed after the initiation of the 2→3 shift-up action. The input shaft speed $N_I$ and the output shaft speed $N_O$ are respectively represented by the output signals of the input shaft speed sensor 69 and vehicle speed sensor 66.

If an affirmative decision (YES) is obtained in step SA5, the control flow goes to step SA6 to cancel the temporary inhibition of a change of the operation mode, that is, to permit the hybrid controller 50 to resume the execution of the sub-routine of FIG. 8.

Step SA6 is followed by step SA7 to determine whether the operation mode should be changed according to the sub-routine of FIG. 8. If a negative decision (NO) is obtained in step SA7, one cycle of execution of the routine of FIG. 10 is terminated. If an affirmative decision (YES) is obtained in step SA7, the control flow goes to step SA8 in which the operation mode selected according to the sub-routine of FIG. 8 is established.

If a negative decision (NO) is obtained in step SA3, it means that the automatic transmission 18 is required to be shifted down from the third-speed position to the second-speed position. In this case, the control flow goes to step SA9 to determine whether a rate of change $d\theta_{AC}/dt$ of the operating amount $\theta_{AC}$ of the accelerator pedal is equal to or larger than a predetermined threshold $\alpha$. This threshold $\alpha$ is a limit value above which it is considered that the operator of the motor vehicle desires to drive the vehicle with high acceleration, rather than desires to drive the vehicle without a shifting shock with temporary inhibition of a change in the operation mode.

If an affirmative decision (YES) is obtained in step SA9, the control flow goes to step SA10 in which the hybrid drive controller 50 selects the operation mode 4, that is, engine-motor drive mode for rapid acceleration of the motor vehicle, irrespective of the operation mode selected according to the sub-routine of FIG. 8. Then, step SA11 is implemented to effect the 3→2 shift-down action of the automatic transmission 18, with the solenoid-operated valves SL1–SL3 being suitably energized and deenergized. In this case, therefore, the operation to change the operation mode to the engine-motor drive mode and the 3→2 shift-down action of the automatic transmission 18 take place concurrently.

If a negative decision (NO) is obtained in step SA9, it means that the operator of the motor vehicle desires to minimize the shifting shock of the automatic transmission 18, rather than rapidly accelerate the vehicle. In this case, the control flow goes to steps SA12–SA17, which are identical with steps SA3–SA8.

As described above, the hybrid drive system 10 according to the present embodiment includes the mode change restricting means corresponding to steps SA4, SA5, SA13 and SA14, which is adapted to inhibit a change of the operation mode by the mode selecting means corresponding to steps SA8, SA17, when the automatic transmission 18 is commanded by the shift control means corresponding steps SA3, SA11 and SA12, to be shifted between the second-speed position and the third-speed position, except when the rate of increase $d\theta_{AC}/dt$ of the operating amount $\theta_{AC}$ of the accelerator pedal is equal to or higher than the threshold $\alpha$. Thus, the present embodiment prevents a change of the operation mode concurrently with the shift-up or shift-down action of the automatic transmission 18 between the second- and third-speed positions. Therefore, the present embodiment is effective to prevent a shifting shock due to a torque variation which would occur if the operation mode were changed during the 2→3 shifting action of the automatic transmission 18. According to the present arrangement, a change of the vehicle operating state from point A to point B in FIG. 11A will first cause the 2→3 shift-up action of the automatic transmission 18, and then a change of the operation mode from the operation mode 1 (motor drive mode) to the operation mode 2 (engine drive mode).

Referring next to the flow chart of FIG. 12, there will be described a routine executed by the automatic transmission controller 52 in a second embodiment of this invention, so as to minimize a shock upon changing of the operation mode. It will be understood from the following explanation that a portion of the controller 52 assigned to implement steps SB5, SB9 and SB11 constitutes shift control means, while a portion of the controller 52 assigned to implement steps SB3 and SB4 constitutes shifting restricting means. It will also be understood that the hybrid drive controller 50 assigned to execute the operation mode determining sub-routine of FIG. 8 constitutes mode selecting means.

Figure 12:
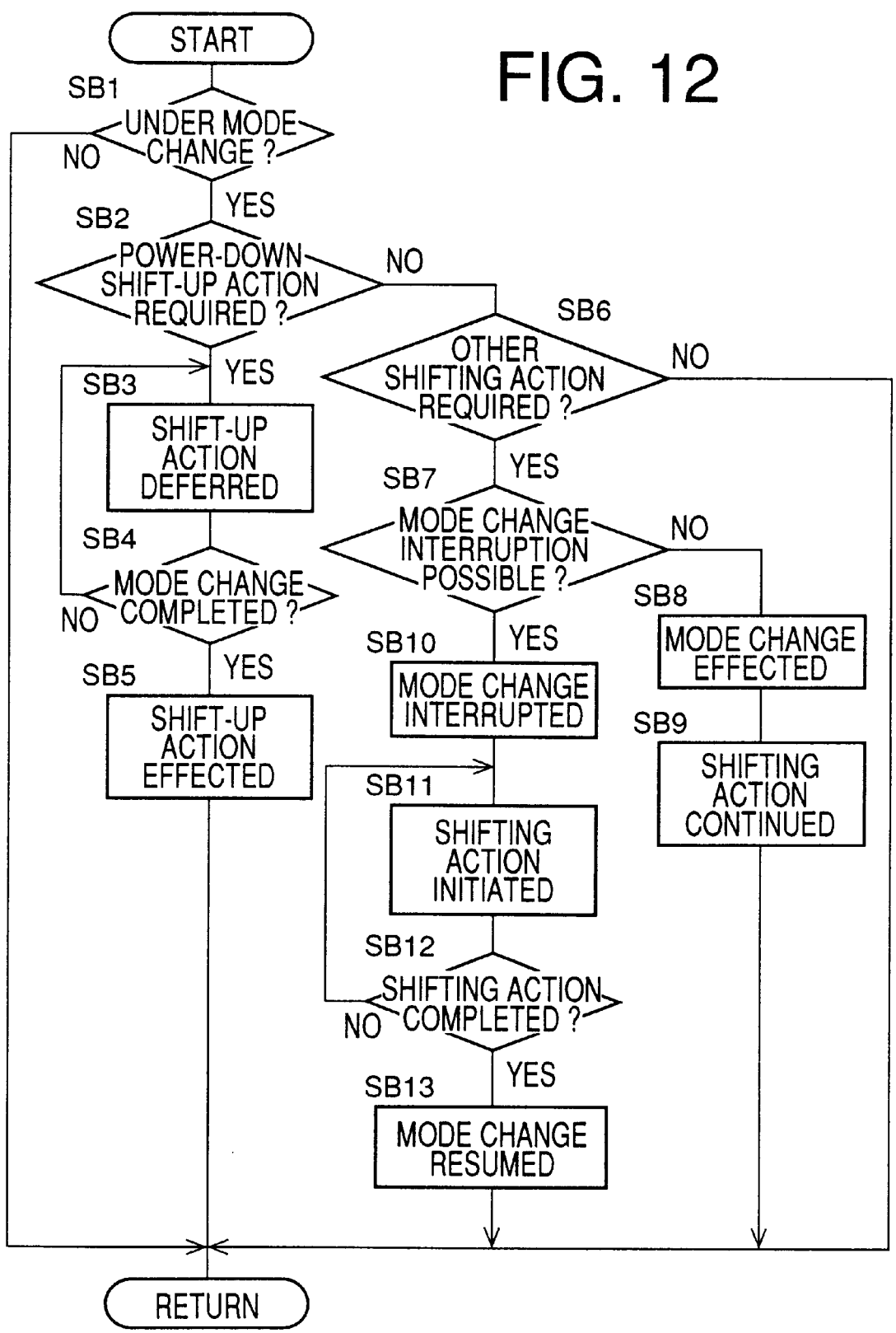
FIG. 12 is a flow chart showing a routine executed according to a second embodiment of this invention.

The routine of FIG. 12 is initiated with step SB1 to determine whether the operation mode is being changed from one mode to another. This determination is made by determining whether the present point of time is between the moment at which the hybrid drive controller 50 generates a signal indicating the selection of a new operation mode, and the moment at which the controller 50 generates a signal indicating that a change of the operation mode to the newly selected mode is completed. If a negative decision (NO) is obtained in step SB1, that is, if the operation mode is not being changed, one cycle of execution of the routine of FIG. 12 is terminated.

If an affirmative decision (YES) is obtained in step SB1, the control flow goes to step SB2 to determine whether a POWER-DOWN shift-up action of the automatic transmission 18 is required. This determination is made by determining whether a point defined by the vehicle speed V and the operating amount $\theta_{AC}$ of the accelerator pedal in the transmission shifting and mode selecting data map of FIG. 11A is moved downward across any one of the shift boundary lines when the operating amount $\theta_{AC}$ of the accelerator pedal is reduced.

If an affirmative decision (YES) is obtained in step SB2, the control flow goes to step SB3 to temporarily defer the POWER-DOWN shift-up action of the automatic transmission 18, without the solenoid-operated valves SL1–SL3 being controlled. Step SB3 is followed by step SB4 to determine whether the required change of the operation mode is completed. This determination is made by determining whether the signal indicating that the required change of the operation mode is completed is received from the hybrid drive controller 50.

If an affirmative decision (YES) is obtained in step SB4, the control flow goes to step SB5 in which the solenoid-operated valves SL1–SL3 are suitably controlled (selectively energized and deenergized) to effect the POWER-DOWN shift-up action of the automatic transmission 18.

If a negative decision (NO) is obtained in step SB2, the control flow goes to step SB6 to determine whether a shifting action of the automatic transmission 18 other than the POWER-DOWN shift-up action is required. The shifting actions other than the POWER-DOWN shift-up action include a POWER-UP shift-up action, a POWER-UP shift-down action and a POWER-DOWN shift-down action. The POWER-UP shift-up action is a shift-up action with an increase in the operating amount $\theta_{AC}$ of the accelerator pedal. The POWER-UP shift-down action is a shift-down action with an increase in the operating amount $\theta_{AC}$ while the POWER-DOWN shift-down action is a shift-down action with a decrease in the operating amount $\theta_{AC}$.

If a negative decision (NO) is obtained in step SB6, it means that none of the shifting actions of the automatic transmission are taking place. In this case, one cycle of execution of the routine of FIG. 12 is terminated. If an affirmative decision (YES) is obtained in step SB6, the control flow goes to step SB7 to determine whether it is possible to interrupt the required change of the operation mode. This determination is effected on the basis of the specific operation mode to be established and the degree of progress of the change to the newly selected mode.

If a negative decision (NO) is obtained in step SB7, it means that it is not possible to interrupt the required change of the operation mode. In this case, the control flow goes to step SB8 in which the required change of the operation mode to the mode selected according to the sub-routine of FIG. 8 is continued. Step SB8 is followed by step SB9 in which the solenoid-operated valves SL1–SL3 are suitably controlled, to effect the required shifting action of the automatic transmission 18. Thus, the mode change and the shifting action of the automatic transmission 18 take place concurrently.

If an affirmative decision (YES) is obtained in step SB7, the control flow goes to step SB10 in which the hybrid drive controller 50 is commanded to interrupt the change of the operation mode. Step SB10 is followed by step SB11 to initiate the required shifting action of the automatic transmission 18 with the valves SL1–SL3 being suitably controlled.

Step SB11 is followed by step SB12 to determine whether the required shifting action is completed. This determination may be effected by determining whether the speed $N_I$ of the input shaft 26 of the automatic transmission 18 has become substantially equal to the speed $N_O$ of the output shaft 19 multiplied by the speed ratio of the operating position to be established by the shifting action in question. Alternatively, the determination may be effected by determining whether a time sufficient for the required shifting action to be completed has elapsed after the initiation of the shifting action in step SB11.

If an affirmative decision (YES) is obtained in step SB12, the control flow goes to step SB13 in which the hybrid drive controller 50 is commanded to resume the required change of the operation mode.

In the present second embodiment described above, the shifting restricting means corresponding to steps SB3, SB4 is adapted to inhibit the POWER-DOWN shift-up action of the automatic transmission 18 by the shift control means corresponding to step SB5, when the operation mode is changed to the mode selected according to the sub-routine of FIG. 8, by the hybrid drive controller 50 which functions as the mode selecting means. Thus, the present second embodiment prevents the POWER-DOWN shift-up action of the automatic transmission 18 concurrently with a change of the operation mode. Therefore, the present embodiment is effective to prevent a shifting shock due to a torque variation which would occur if the POWER-DOWN shift-up action were changed during changing of the operation mode.

The second embodiment is further adapted to interrupt a change of the operation mode in step SB10 if the change of the operation mode can be interrupted when a shifting action of the automatic transmission 18 other than the POWER-DOWN shift-up action is required. During the interruption of the change of the operation mode, the required shifting action of the automatic transmission is effected in step SB11, and the change of the operation mode is resumed in step SB13. Thus, the hybrid drive system according to the second embodiment is adapted to prevent concurrent operations to change the operation mode and effect the shifting action of the transmission other than the POWER-DOWN shift-up action. It will be understood that a portion of the automatic transmission controller 52 assigned to implement steps SB10 and SB12 constitutes the mode change restricting means for interrupting the mode change when a shifting action of the automatic transmission other than the POWER-DOWN shift-up action is taking place.

Figure 11B:
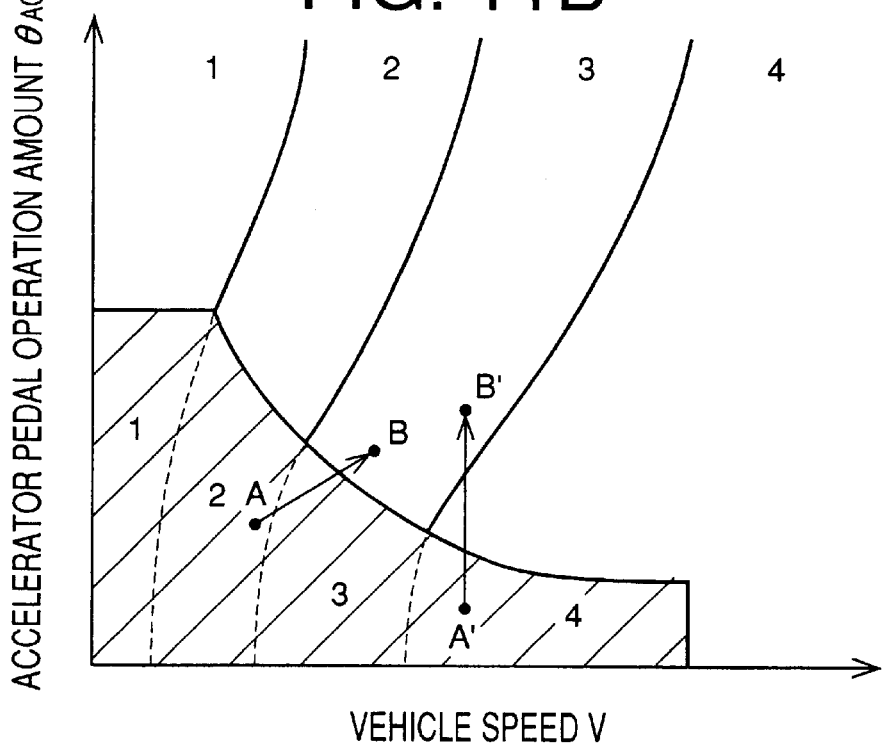

There will next be described a third embodiment of the present invention, wherein the shift boundary lines used for shifting the automatic transmission 18 are formulated as shown in FIG. 11B, more specifically, such that the shift boundary lines used when the engine drive mode is selected or established and the shift boundary lines used when the motor drive mode is selected or established are made continuous with each other, at the mode selecting boundary line between the engine drive condition indicated by the hatched area in FIG. 11B and the motor drive condition indicated by the non-hatched area, contrary to the shift boundary lines in FIG. 11A. The shift boundary lines used in the engine drive mode according to the present third embodiment of the invention are determined so as to minimize the fuel consumption of the engine 12, as indicated by solid lines in FIG. 11B, like the shift boundary lines of FIG. 11A which are used in the engine drive mode in the first and second embodiments. However, the shift boundary lines used in the motor drive mode in the third embodiment are modified so as to be continuous with the shift boundary lines for the engine drive mode. That is, the shift boundary lines for the motor drive mode are extensions of the shift boundary lines for the engine drive mode. The transmission shifting and mode selecting data map of FIG. 11B is also stored in the ROM of the controllers 50, 52.

The present third embodiment using the shift boundary lines as indicated in FIG. 11B makes it possible to prevent concurrent operations to change the operation mode and the speed ratio of the automatic transmission 18, except when the operating condition of the vehicle (as represented by $\theta_{AC}$ and V) lies on a point of intersection between the shift boundary lines and the mode selecting boundary line for selecting the operation mode (either engine drive mode or motor drive mode). Further, the present third embodiment does not require mode change restricting means or shifting restricting means as used in the first and second embodiments. If the point determined by the operating condition of the vehicle is moved from point A to point B as indicated in FIG. 11B, the automatic transmission 18 is first shifted up from the second-speed position "2nd" to the third-speed position "3rd" while the hybrid drive system or motor vehicle is held in the motor drive mode (operation mode 1). Then, the operation mode is changed from the motor drive mode to the engine drive mode (operation mode 2) with the automatic transmission 18 placed in the third-speed position. If the point determined by the vehicle operating condition is moved from point A' to point B', the operation mode is first changed from the motor drive mode to the engine drive mode while the automatic transmission 18 is held in the third-speed position "3rd", and the automatic transmission 18 is then shifted down from the fourth-speed position "4th" to the third-speed position "3rd" while the hybrid drive system is placed in the engine drive mode. Thus, the operation to change the operation mode and the operation to shift the automatic transmission do not take place simultaneously, and frequent shifting actions of the automatic transmission are avoided.

The third embodiment may incorporate the mode change restricting means (SA3, SA4, SA11, SA12, SB10, SB12) provided in the first embodiment of FIGS. 10 and 11A and the second embodiment of FIGS. 11A and 12, and/or the shifting restricting means (SB3, SB4) provided in the second embodiment. Conversely, the first and second embodiments may use the shift boundary lines of FIG. 11B used in the third embodiment.

Referring next to the schematic view of 13 and the flow chart of FIG. 14, there will be described a fourth embodiment of the present invention, which is adapted to minimize a shock upon changing of a ratio of torque distribution to the front and rear drive wheels of the motor vehicle. It will be understood from the following description that a portion of the hybrid drive controller 50 assigned to implement steps SC5 and SC12 of FIG. 14 constitutes mode selecting means for selecting one of the operation modes, while a portion of the controller 50 assigned to implement steps SC8 and SC9 of FIG. 14 constitutes mode change restricting means. It will also be understood that a portion of the controller 50 assigned to implement steps SC6 and SC7 of FIG. 14 constitutes torque distribution ratio changing means for changing the ratio of torque distribution to the front and rear drive wheels.

Figure 13:
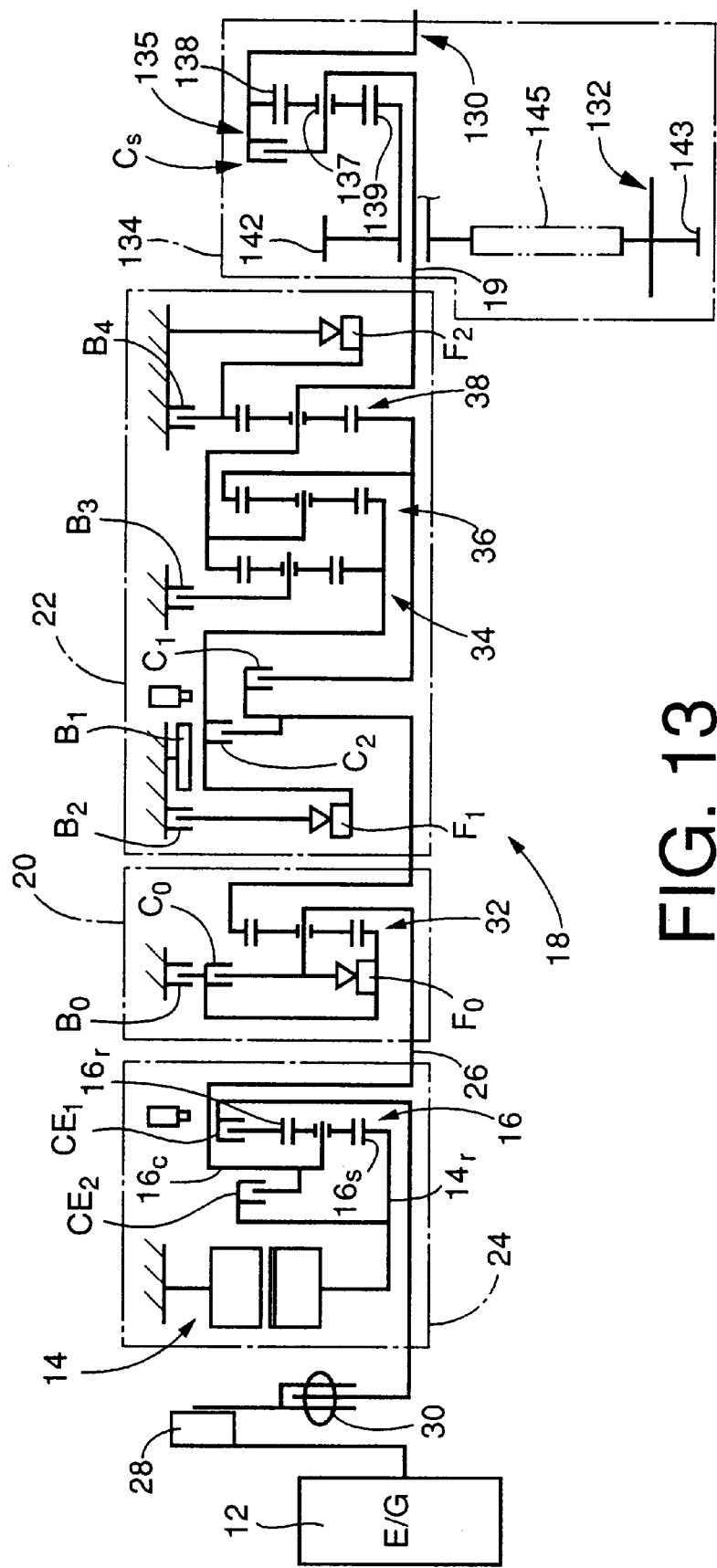
FIG. 13 is a schematic view illustrating a general arrangement of a hybrid drive system equipped with a center differential device, which is constructed according to a third embodiment of the present invention.

In the hybrid drive system of the present fourth embodiment, there is provided a transfer device or center differential device 134, as shown in FIG. 13. The center differential device 134 is connected to the output shaft 19 of the automatic transmission 18, for distributing an output torque $T_O$ of the automatic transmission 18 to a rear output shaft 130 and a front output shaft 132. The center differential device 134 includes a planetary gear device 135 disposed coaxially with the output shaft 19. The planetary gear device 135 includes a carrier 137 connected to the output shaft 19, and a ring gear 138 which is connected to the rear output shaft 130 disposed coaxially with the output shaft 19. The ring gear 138 is rotated with the rear output shaft 130. The center differential device 134 functions as a torque distributing mechanism for distributing the torque to the rear and front output shafts 130, 132.

The center differential device 134 further includes a sun gear 139 formed integrally with a drive sprocket 142 which is disposed radially outwardly of and coaxially with the output shaft 19. The drive sprocket 142 is connected by a chain 145 to a driven sprocket 143 fixed to the front output shaft 132 which is parallel to the output shaft 19.

Between the carrier 137 and the ring gear 138, there is provided a differential limiting mechanism in the form of a differential limiting clutch Cs. The differential limiting clutch Cs is a hydraulically operated wet-type multiple-disc clutch. A hydraulic pressure applied to the clutch Cs for engagement thereof is controlled either continuously or in steps by a linear solenoid valve or other suitable pressure regulating means.

The above-indicated hydraulic pressure applied to engage the differential limiting clutch Cs (engaging hydraulic pressure of the clutch Cs) determines a torque Tc which is transmitted through the differential limiting clutch Cs and which determines the ratio of distribution of the torque from the automatic transmission 18 to the rear and front output shafts 130, 132, namely, to the rear and front drive wheels of the motor vehicle. The manner of controlling the engaging hydraulic pressure of the clutch Cs is well known in the art. Generally, the differential limiting torque Tc of the differential limiting clutch Cs is increased with an increase in the difference between the speeds of the front and rear drive wheels. Alternatively, the differential limiting torque Tc may be controlled such that a detected actual yaw rate of the vehicle coincides with a target value, which is calculated on the basis of the steering angle and running speed of the vehicle. This latter manner of controlling the differential limiting torque Tc is based on a fact that the ease of turning of the vehicle increases as the torque of the rear drive wheels increases.

Figure 14:
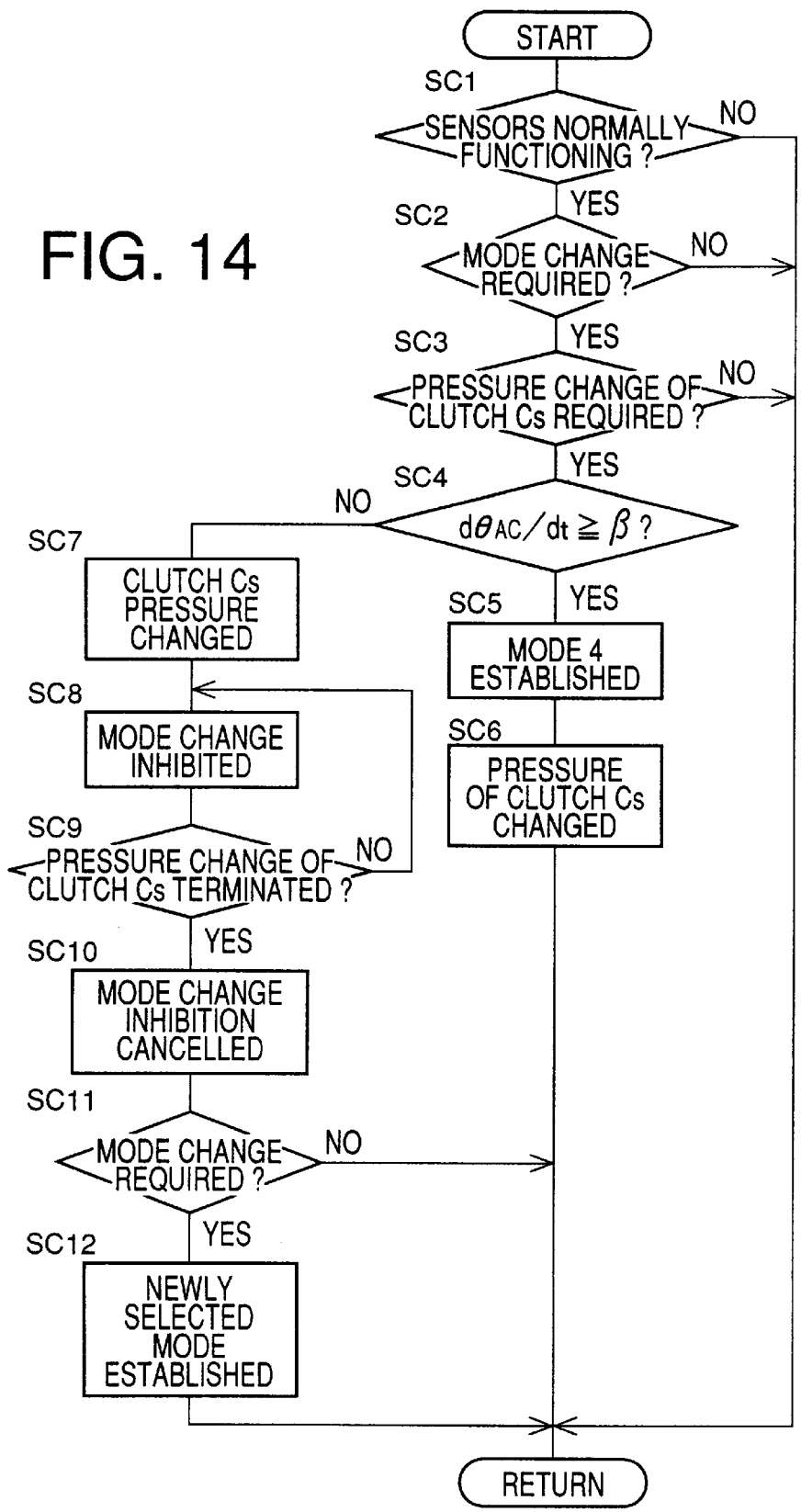
FIG. 14 is a flow chart illustrating a routine executed according to a fourth embodiment of the invention.

A routine illustrated in the flow chart of FIG. 14 is initiated with step SC1 to determine whether the various sensors provided in the hybrid drive system are all normally functioning. If an affirmative decision (YES) is obtained in step SC2, the control flow goes to step SC2 to determine whether a change of the operation mode is required according to the operation mode determining sub-routine of FIG. 8.

If an affirmative decision (YES) is obtained in step SC2, the control flow goes to step SC3 to determine whether the engaging hydraulic pressure of the differential limiting clutch Cs should be changed. This determination may be effected on the basis of suitable parameters such as the yaw rate, steering angle and running speed of the vehicle, and according to a predetermined torque distribution data map. Alternatively, the determination may be effected on the basis of a change in the speed difference $\Delta N_{FR}$ of the front and rear drive wheels.

If an affirmative decision (YES) is obtained in step SC3, the control flow goes to step SC4 to determine whether a rate of change $d\theta_{AC}/dt$ of the operating amount $\theta_{AC}$ of the accelerator pedal is equal to or larger than a predetermined threshold $\beta$. This threshold $\beta$ is a limit value above which it is considered that the operator of the vehicle desires to drive the vehicle with a high degree of acceleration. The threshold β is determined by experiments.

If an affirmative decision (YES) is obtained in step SC4, the control flow goes to step SC5 in which the operation mode 4 (engine•motor drive mode) is established to drive the vehicle with both the engine 12 and the motor/generator 14, in order to meet the operator's desire for rapid acceleration of the vehicle. Step SC5 is followed by step SC6 in which the engaging hydraulic pressure of the differential limiting clutch Cs is changed according to the predetermined torque distribution data map or on the basis of the speed difference $\Delta N_{FR}$. In this case, the operations to change the operation mode (establish the operation mode 4) and to change the engaging hydraulic pressure of the clutch Cs are effected concurrently. The control of the hydraulic pressure of a differential limiting clutch is disclosed in detail in JP-A-6-107014.

If a negative decision (NO) is obtained in step SC4, it means that the operator of the vehicle does not desire rapid acceleration of the vehicle. In this case, the control flow goes to step SC7 in which the hydraulic pressure of the clutch Cs is changed according to the torque distribution data map, for example. Step SC7 is followed by step SC8 to temporarily inhibit a change of the operation mode.

Step SC8 is followed by step SC9 to determine whether the required change of the hydraulic pressure of the differential limiting clutch Cs is terminated. This determination may be effected on the basis of a rate of change of the hydraulic pressure as compared with a predetermined threshold, or on the basis of a time lapse after the initiation of the change of the hydraulic pressure. If a negative decision (NO) is obtained in step SC9, the control flow goes back to step SC8. Steps SC8 and SC8 are repeatedly implemented to continue the inhibition of the change of the operation mode, until an affirmative decision (YES) is obtained in step SC9. If an affirmative decision (YES) is obtained in step SC9, the control flow goes to step SC10 to cancel the inhibition of the change of the operation mode, that is, permit the operation mode to be changed if a change of the operation mode is required.

Step SC10 is followed by step SC11 to determine whether a change of the operation mode is required according to the sub-routine of FIG. 8. If an affirmative decision (YES) is obtained in step SC11, the control flow goes to step SC12 in which the operation mode is changed to the mode selected according to the sub-routine of FIG. 8.

The hybrid drive system according to the present fourth embodiment includes mode change restricting means corresponding to step SC8, which is adapted to restrict or inhibit a change of the operation mode by the mode selecting means corresponding to steps SC5 and SC12, when the hydraulic pressure of the differential limiting clutch Cs is changed by the torque distribution ratio changing means corresponding to step SC7. Thus, the present system is adapted to prevent a change of the operation mode concurrently with a change of the ratio of the torque distribution by the differential limiting clutch Cs. Therefore, the present embodiment is effective to prevent a shock due to a torque variation which would occur if the operation mode were changed during a change of the torque distribution ratio.

Referring to the flow chart of FIG. 15, there will be described a routine executed by the hybrid drive controller 50 in a fifth embodiment of this invention, so as to minimize a shock upon changing of the operation mode. It will be understood from the following explanation that a portion of the controller 52 assigned to implement steps SD5, SD9 and SD11 constitutes torque distribution ratio changing means for changing the torque distribution ratio of the center differential device 134, while a portion of the controller 50 assigned to implement step SD3 constitutes torque distribution ratio change restricting means for restricting a change of the torque distribution ratio of the center differential device 134. It will also be understood that the hybrid drive controller 50 assigned to execute the operation mode determining sub-routine of FIG. 8 constitutes mode selecting means for selecting one of a plurality of operation modes.

Figure 15:
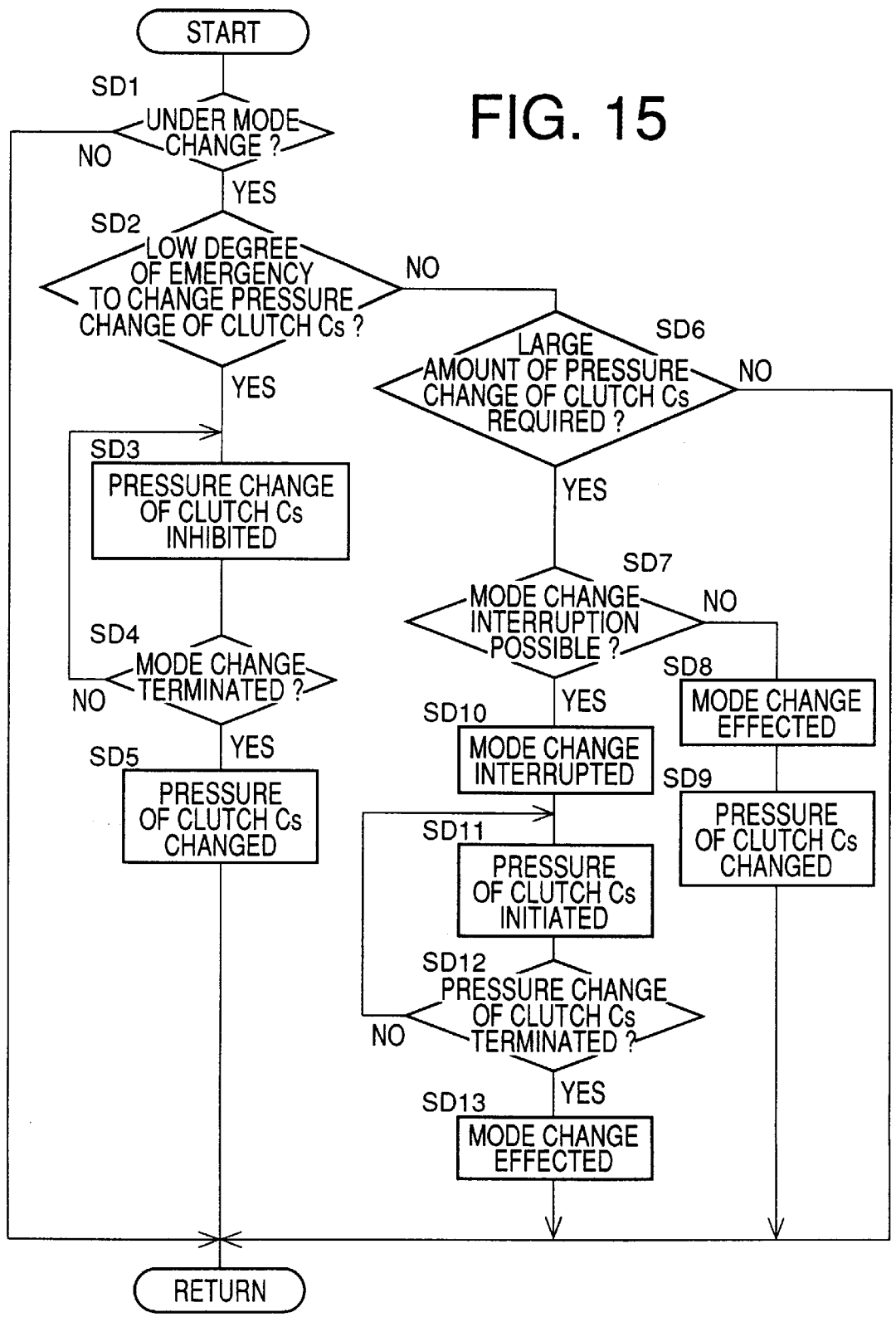
FIG. 15 is a flow chart illustrating a routine executed according to a fifth embodiment of the invention.

The routine of FIG. 15 is initiated with step SD1 to determine whether the operation mode is being changed from one mode to another. This determination is made by determining whether the present point of time is between the moment at which the hybrid drive controller 50 generates a signal indicating the selection of a new operation mode, and the moment at which the controller 50 generates a signal indicating that a change of the operation mode to the newly selected mode is completed.

If an affirmative decision (YES) is obtained in step SD1, the control flow goes to step SD2 to determine whether a degree of emergency to change the engaging hydraulic pressure of the differential limiting clutch Cs is relatively low. The degree of this emergency is relatively high when the amount of slip of the clutch Cs is controlled upon or during starting of the vehicle. The degree of the emergency is relatively low when the vehicle is running in a comparatively steady state without the slip control of the clutch Cs.

If an affirmative decision (YES) is obtained in step SD2, it means that the degree of emergency to change the hydraulic pressure of the differential limiting clutch Cs is relatively low. In this case, the control flow goes to step SD3 to inhibit a change of the hydraulic pressure of the clutch Cs. Step SD3 is followed by step SD4 to determine whether whether the required change of the operation mode is completed.

If a negative decision (NO) is obtained in step SD4, steps SD3 and SD4 are repeatedly implemented to continue the inhibition of the change of the hydraulic pressure of the clutch Cs until an affirmative decision (YES) is obtained in step SD4. With the affirmative decision obtained in step SD4, the control flow goes to step SD5 in which the hydraulic pressure of the clutch Cs is changed according to a predetermined torque distributing pattern as represented by a stored data map.

If a negative decision (NO) is obtained in step SD2, it means that the degree of emergency to change the hydraulic pressure of the clutch Cs is relatively high. In this case, the control flow goes to step SD6 to determine whether the amount of change of the hydraulic pressure of the clutch Cs required according to the torque distributing pattern is larger than a predetermined threshold.

If an affirmative decision (YES) is obtained in step SD6, it means that the hydraulic pressure of the clutch Cs is required to be changed by a relatively large amount, and that this change of the hydraulic pressure would cause a considerable shock if it took place concurrently with a change of the operation mode. In this case, the control flow goes to step SD7 to determine whether it is possible to interrupt the change of the operation mode. This determination is effected on the basis of the specific operation mode to be established and the degree of progress of the change to the newly selected mode.

If a negative decision (NO) is obtained in step SD7, it means that it is not possible to interrupt the required change of the operation mode. In this case, the control flow goes to step SD8 in which the required change of the operation mode to the mode selected according to the sub-routine of FIG. 8 is continued. Step SD8 is followed by step SD9 to change the hydraulic pressure of the differential limiting clutch Cs. Thus, the mode change and the change of the hydraulic pressure of the clutch Cs take place concurrently.

If an affirmative decision (YES) is obtained in step SD7, the control flow goes to step SD10 to interrupt the change of the operation mode. Step SD10 is followed by step SD11 to initiate the required change of the hydraulic pressure of the clutch Cs according to the torque distributing pattern.

Step SD11 is followed by step SD12 to determine whether the required change of the hydraulic pressure of the clutch Cs is terminated. If a negative decision (NO) is obtained in step SD12, steps SD11 and SD12 are repeatedly implemented to effect the required change of the hydraulic pressure of the clutch Cs. If an affirmative decision (YES) is obtained in step SD12, the control flow goes to step SD13 in which the required change of the operation mode is effected.

In the present fifth embodiment described above, the torque distribution ratio change restricting means corresponding to step SD3 is adapted to inhibit a change of the hydraulic pressure of the differential limiting clutch Cs by the torque distribution ratio changing means corresponding to steps SD5, SD9, SD11, when the operation mode is changed to the mode selected according to the sub-routine of FIG. 8 by the hybrid drive controller 50 which functions as the mode selecting means. Thus, the present second embodiment prevents a change of the torque distribution ratio of the center differential device 134, concurrently with a change of the operation mode. Therefore, the present embodiment is effective to prevent a shock due to a torque variation which would occur if the torque distribution ratio were changed during changing of the operation mode.

The fifth embodiment is further adapted to interrupt a change of the operation mode in step SD10 if the change of the operation mode can be interrupted when the degree of emergency to change the torque distribution ratio is relatively high, and if the change of the operation mode can be interrupted. During the interruption of the change of the operation mode, the required change of the hydraulic pressure is effected in step SD11, and the change of the operation mode is resumed in step SD13. Thus, the hybrid drive system according to the fifth embodiment is adapted to prevent concurrent operations to change the operation mode and the torque distribution ratio of the center differential device 134. It will be understood that a portion of the hybrid drive controller 50 assigned to implement steps SD10 and SD12 constitutes the mode change restricting means for interrupting the mode change when the hydraulic pressure of the clutch Cs is changed.

Figure 16:
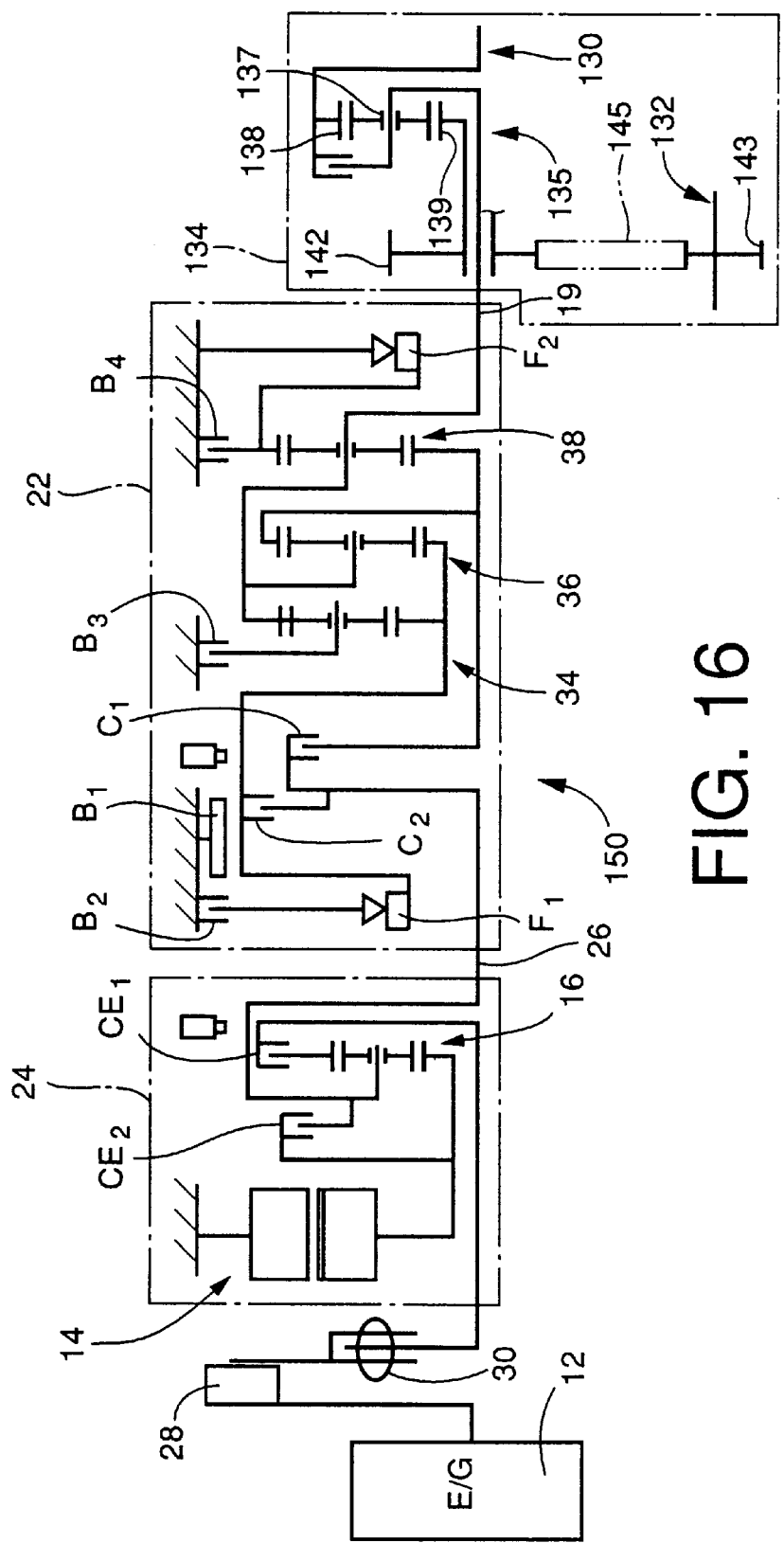
FIG. 16 is a schematic view illustrating a hybrid drive system according to a sixth embodiment of the invention.

The hybrid drive system 10 of FIG. 1 and the hybrid drive system of FIG. 13 may be replaced by a hybrid drive system shown in FIG. 16 constructed according to a sixth embodiment of the invention. This hybrid drive system uses an automatic transmission 150 which does not include the auxiliary transmission 20 and employs only the primary transmission 22. While the automatic transmission 18 of the hybrid drive system of FIG. 1 or 13 has one rear drive position and five forward drive positions, the automatic transmission 150 used according to the present sixth embodiment has one rear drive position and four forward drive positions, as indicated in FIG. 17. The hybrid drive system of FIGS. 16 and 17 may incorporate any of the features described above with respect to the first through fifth embodiments.

A seventh embodiment of the present invention will be described by reference to the flow chart of FIG. 18, which illustrates a routine executed by the hybrid drive controller 50 provided for the hybrid drive system of FIG. 1. It will be understood from the following explanation that a portion of the controller 50 assigned to implement step SE5 constitutes mode change restricting means for restricting a change of the operation mode.

Figure 18:
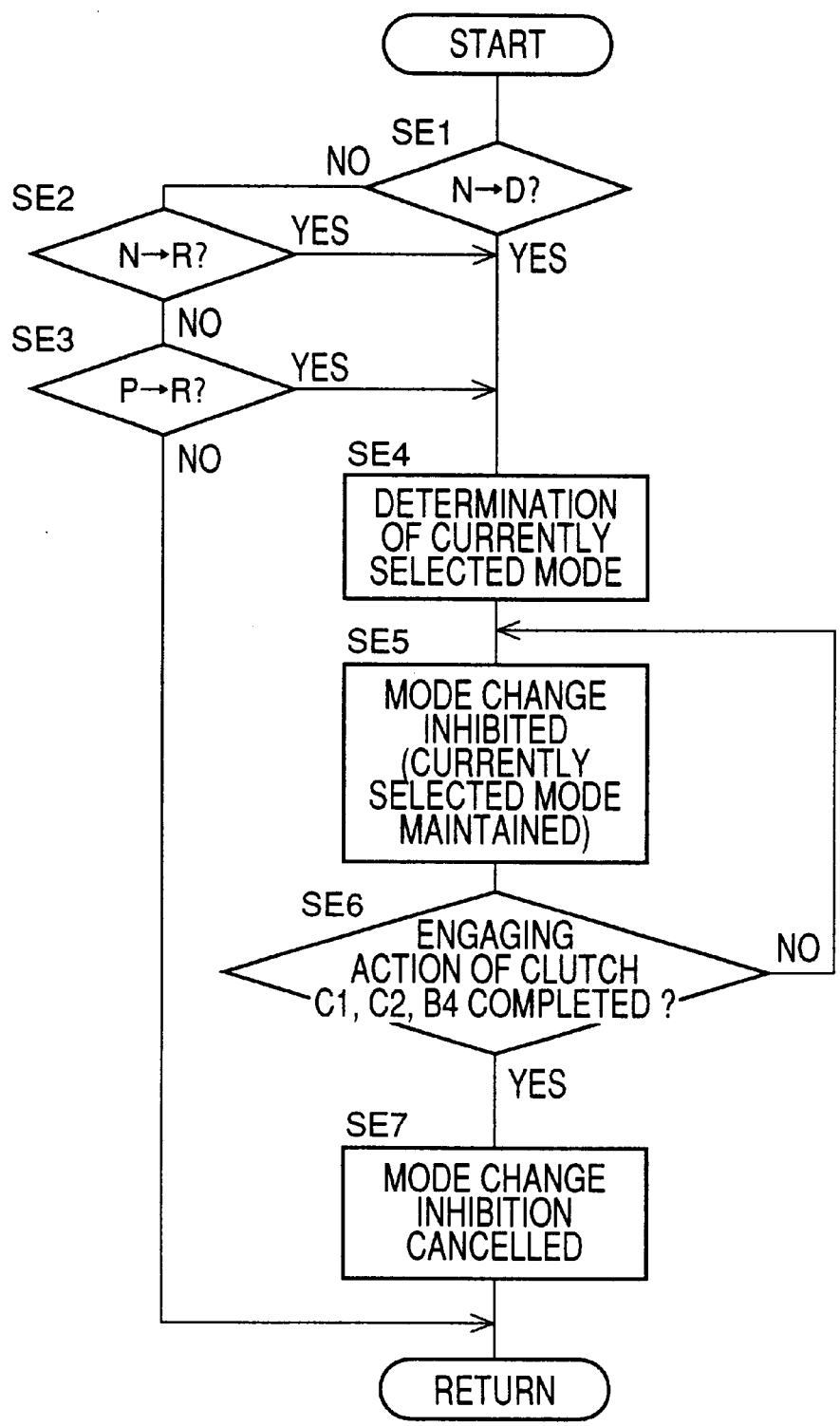
FIG. 18 is a flow chart illustrating a routine executed according to a seventh embodiment of the invention.

The routine of FIG. 18 is initiated with step SE1 to determine whether the shift lever 42 is operated from the neutral position "N" to the drive position "D". If a negative decision (NO) is obtained in step SE1, the control flow goes to step SE2 to determine whether the shift lever 42 is operated from the neutral position "N" to the reverse position "R". If a negative decision (NO) is obtained in step SE2, the control flow goes to step SE3 to determine whether the shift lever 42 is operated from the parking position "P" to the reverse position "R". The determinations in steps SE1–SE3 are effected on the basis of the output signal of the shift position sensor 68 shown in FIG. 2.

If an affirmative decision (YES) is obtained in any one of steps SE1–SE3, it means that the automatic transmission 18 is switched from the non-drive state to the drive state. In this case, the control flow goes to step SE4 to detect an operation mode of the hybrid drive system or motor vehicle, which is currently selected according to the operation mode determining sub-routine of FIG. 8.

Step SE4 is followed by step SE5 to inhibit a change of the operation mode, that is, maintain the operation mode as detected in step SE4, irrespective of a change or changes in the vehicle running speed V and/or the operating amount $\theta_{AC}$ of the accelerator pedal. When the shift lever 42 is operated from the neutral or parking position "N", "P" to the drive or reverse position "D", "R", either the operation mode 1 (motor drive mode) for starting the vehicle with the motor/generator 14 operated as the drive power source, or the operation mode 5 (vehicle start by engine mode) for starting the vehicle with the engine 12 operated as the drive power source, is selected according to the sub-routine of FIG. 8, on the basis of the electric energy amount SOC stored in the storage device 58. Accordingly, the hybrid drive system is held in the operation mode 1 or operation mode 5.

Step SE5 is followed by step SE6 to determine whether an engaging action of the clutch C1 is completed, or whether engaging actions of the clutch C2 and brake B4 are completed. In this respect, it is noted that the clutch C1 is engaged when the shift lever 42 is operated from the neutral position "N" to the drive position "D", that is, when the affirmative decision is obtained in step SE1, and that the clutch C2 and the brake B4 are engaged when the shift lever 42 is operated from the neutral or parking position "N", "P" to the reverse position "R", namely, when the affirmative decision is obtained in step SE2 or SE3.

If a negative decision (NO) is obtained in step SE6, steps SE5 and SE6 are repeatedly implemented to inhibit a change of the operation mode or hold the operation mode detected in step SE4, until an affirmative decision (YES) is obtained in step SE6. When the affirmative decision is obtained in step SE6, the control flow goes to step SE7 to cancel the inhibition of a change of the operation mode, that is, to permit the operation mode to be changed according to the sub-routine of FIG. 8.

Figure 19:
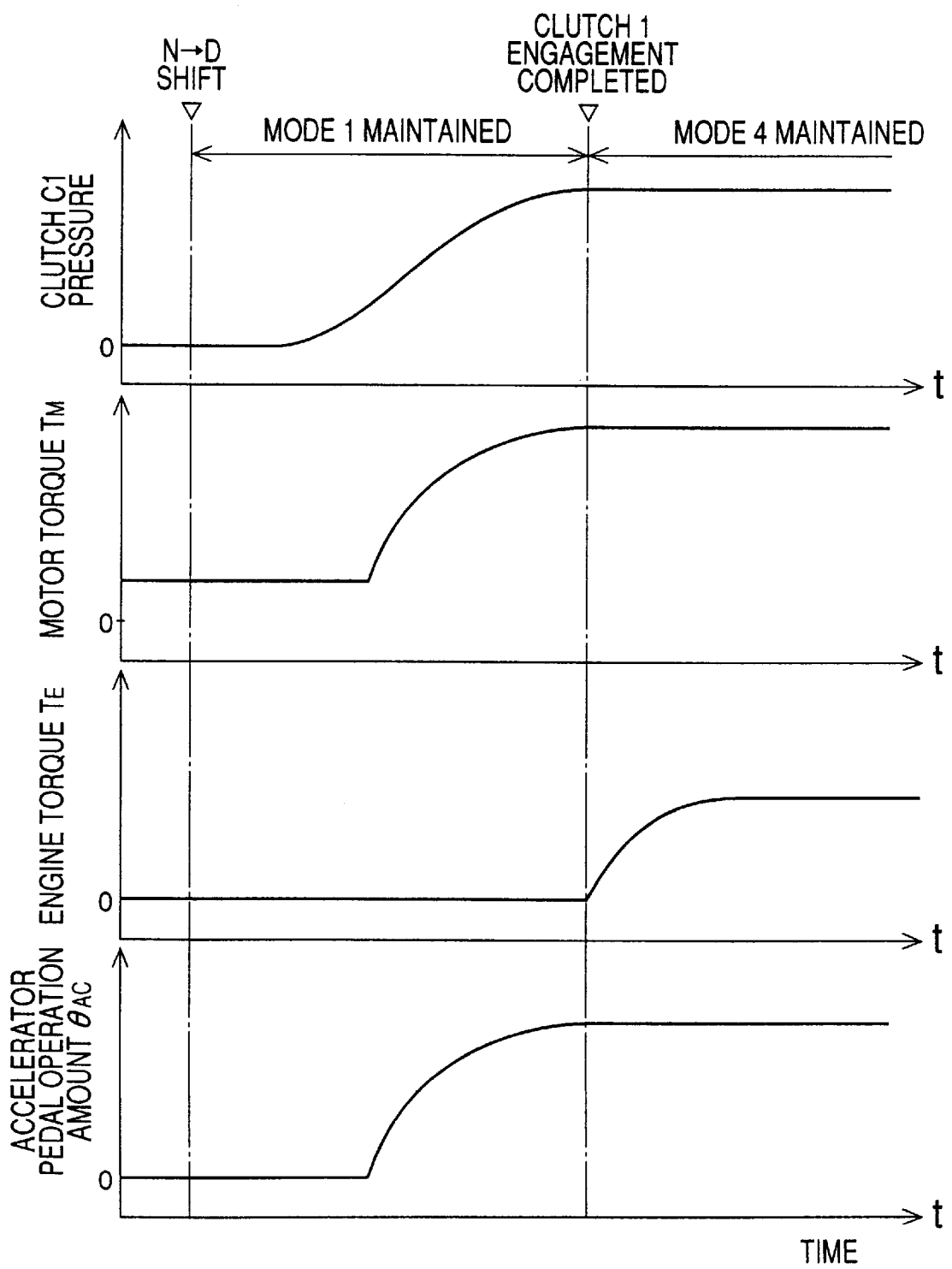
FIG. 19 is a time chart for explaining a change in the operation mode upon operation of a shift lever from neutral position "N" to drive position "D", in the embodiment of FIG. 18.

The graph of FIG. 19 is a time chart explaining a manner of controlling a change of the operation mode when the shift lever 42 is operated from the neutral position "N" to the drive position "D", namely, when the automatic transmission 18 is switched from the non-drive state to the drive state. After the operation of the shift lever 42 from the neutral position "N" to the drive position "D", a change of the operation mode is inhibited until the engaging action of the clutch C1 is completed. Therefore, the operation mode 1 is maintained during a shifting operation of the automatic transmission 18 in response to the operation of the shift lever 42 from the neutral position "N" to the drive position "D", even if the operating amount $\theta_{AC}$ of the accelerator pedal is abruptly increased, as indicated in FIG. 19. In the present arrangement, only the motor torque $T_M$ increases with an increase in the operating amount $\theta_{AC}$, but the engine torque $T_E$ is held constant. Upon completion of the engaging action of the clutch C1, the operation mode is changed from the operation mode 1 to the operation mode 4 which is selected according to the sub-routine of FIG. 8, and the engine torque $T_E$ increases to a level corresponding to the operating amount 74 $_{AC}$ of the accelerator pedal.

In the present seventh embodiment, the operation mode is inhibited from being changed when the power transmitting device in the form of the automatic transmission 18 is switched from the non-drive state to the drive state in response to an operation of the shift lever 42 from the neutral or parking position "N", "P" to the drive or reverse position "D", "R". Thus, the present embodiment is adapted to prevent a variation in the output of the drive power source due to a change of the operation mode upon switching of the automatic transmission 18 from the non-drive state to the drive state, whereby the automatic transmission 18 can be smoothly shifted to the drive state, with a reduced shifting shock.

Referring next to the flow chart of FIG. 20, there will be described an eighth embodiment of the present embodiment. The flow chart illustrates a routine executed by the hybrid drive controller 50 provided in the hybrid drive system of FIG. 1. It will be understood from the following explanation that a portion of the controller 50 assigned to implement step SF6 of the routine of FIG. 20 constitutes output control means for controlling the drive power source such that an output of the drive power source is held substantially constant when the power transmitting device in the form of the automatic transmission 18 is switched from the non-drive state to the drive state. It will also be understood that a portion of the controller 50 assigned to implement step SF9 constitutes input cutting means for cutting a power transfer from the drive power source to the power transmitting device when the power transmitting device is switched from the non-drive state to the drive state.

Figure 20:
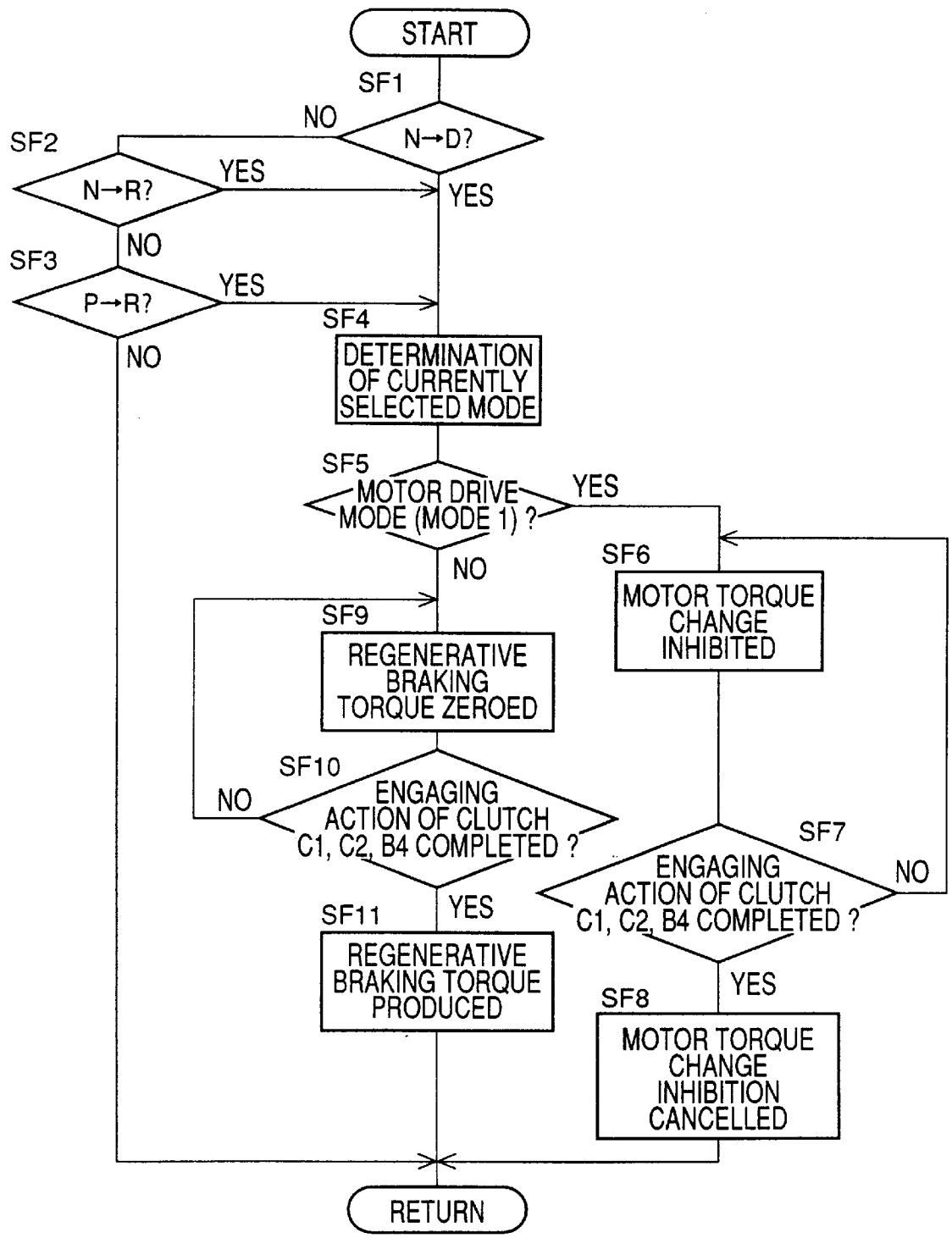
FIG. 20 is a flow chart illustrating a routine executed according to an eighth embodiment of the invention.

The routine of FIG. 20 includes steps SF1 through SF4 which are identical with steps SE1–SE4 of the routine of FIG. 18. Step SF4 is followed by step SF5 to determine whether the operation mode as detected in step SF4 is the operation mode 1 (motor drive mode) in which the vehicle is started and driven with the motor/generator 14.

If an affirmative decision (YES) is obtained in step SF5, the control flow goes to step SF6 in which the motor torque $T_E$ is held constant, for example, held zero or at a value close to zero, irrespective of a change in the operating amount $\theta_{AC}$ of the accelerator pedal. That is, a change of the motor torque $T_E$ is inhibited.

Step SF6 is followed by step SF7 to determine whether the engaging action of the clutch C1 is completed, or whether the engaging actions of the clutch C2 and brake B4 are completed. Step SF7 is identical with step SE6 of FIG. 18.

If a negative decision (NO) is obtained in step SF7, steps SF6 and SF7 are repeatedly implemented until an affirmative decision (YES) is obtained in step SF7. When the affirmative decision is obtained in step SF7, the control flow goes to step SF8 to cancel the inhibition of a change of the motor torque $T_E$, namely, permit the motor torque to be changed according to the operating amount $\theta_{AC}$ of the accelerator pedal. In this respect, it is desirable to gradually increase the motor torque $T_E$ in step SF8.

If a negative decision (NO) is obtained in step SF5, it means that the hybrid drive system is placed in the operation mode 5 in which the vehicle is started by the engine 12. In this case, the control flow goes to step SF9 in which the regenerative braking torque of the motor/generator 14 is zeroed to place the electrically operated torque converter 24 in the neutral position, irrespective of the operating amount $\theta_{AC}$ of the accelerator pedal, whereby the power transfer from the engine 12 to the automatic transmission 18 is cut.

Step SF9 is followed by step SF10 identical with step SF7. When an affirmative decision (YES) is obtained in step SF10, the control flow goes to step SF11 in which the regenerative braking torque of the motor/generator 14 is controlled to gradually increase according to the operating amount $\theta_{AC}$ of the accelerator pedal, whereby the power is transmitted from the engine 12 through the electrically operated torque converter 24 to the automatic transmission 18.

Figure 21:
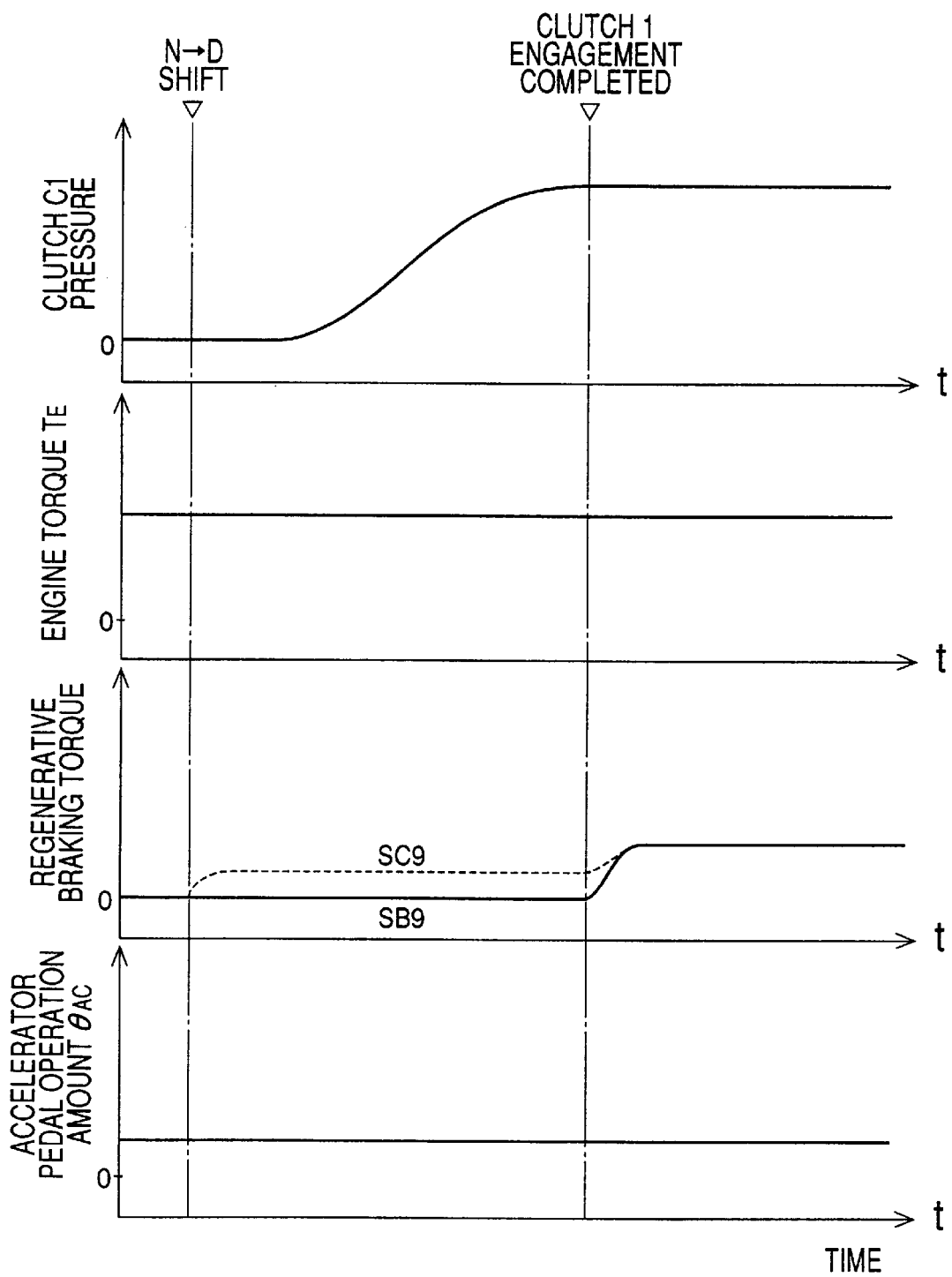
FIG. 21 is a time chart for explaining a change in regenerative braking torque upon operation of shift lever from neutral position "N" to drive position "D"

The graph of FIG. 21 shows a change in the regenerative braking torque of the motor/generator 14 when the vehicle is started in the operation mode 5 in response to the operation of the shift lever 42 from the neutral position "N" to the drive position "D". As indicated by solid line, the regenerative braking torque of the motor/generator 14 is held zero during a period between the operation of the shift lever 42 and the completion of the engaging action of the clutch C1, irrespective of the operating amount $\theta_{AC}$ of the accelerator pedal.

In the hybrid drive system according to the eighth embodiment of the invention, the power transfer from the drive power source to the automatic transmission 18 is cut by the input cutting means corresponding to step SF9, when the automatic transmission 18 is switched from the non-drive state to the drive state in response to the operation of the shift lever 42 from the neutral or parking position "N", "P" to the drive or reverse position "D", "R". Thus, the present embodiment permits smooth switching of the automatic transmission 18 to the drive state, with a reduced shifting shock, even in the presence of a variation in the output of the drive power source due to a change in the operating amount $\theta_{AC}$ of the accelerator pedal or due to a change of the operation mode. Further, the output of the drive power source is held substantially constant while the automatic transmission 18 is switched to the drive state, whereby the automatic transmission 18 can be smoothed switched to the drive state with a reduced shifting shock, irrespective of a change of the operation mode and/or a change in the operating amount $\theta_{AC}$ of the accelerator pedal.

Figure 22:
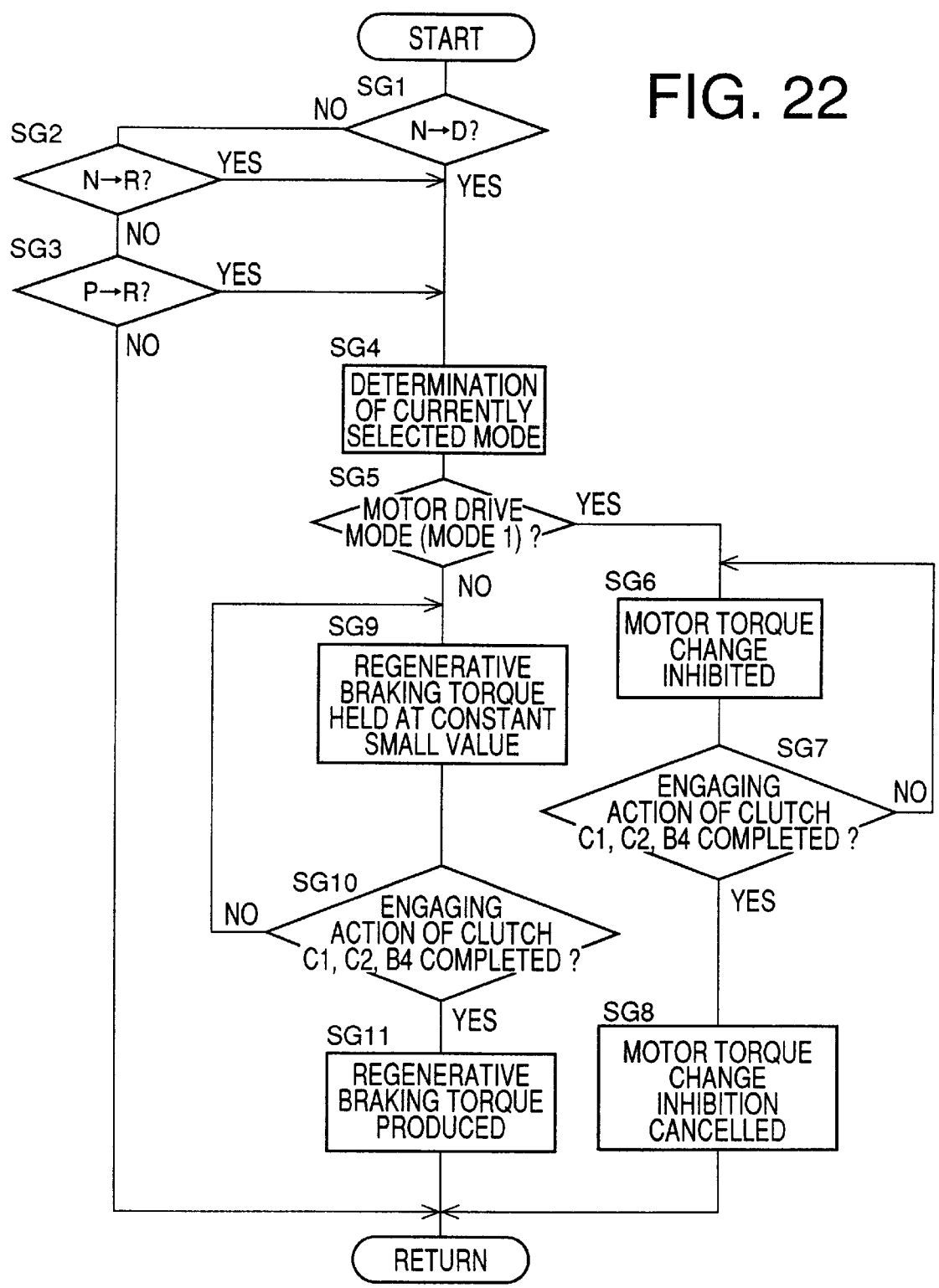
FIG. 22 is a flow chart illustrating a routine executed according to a ninth embodiment of this invention.

Reference is now made to the flow chart of FIG. 22 illustrating a routine which is executed, according to a ninth embodiment of this invention, by the hybrid drive controller 50 provided in the hybrid drive system of FIG. 1. It will be understood from the following explanation that a portion of the controller 50 assigned to implement steps SG6 and SG9 constitutes the output control means.

The routine of FIG. 22 includes steps SG1–SG8 which are identical with steps SF1–SF8 of the routine of FIG. 20. When the affirmative decision (YES) is obtained in step SG5, that is, when the operation mode detected in step SG4 is the engine drive mode in which the vehicle is started with the engine 12, the control flow goes to step SG9 in which the regenerative braking torque of the motor/generator 14 is held at a predetermined constant small value, irrespective of the operating amount $\theta_{AC}$ of the accelerator pedal. Step SG9 is followed by steps SG10 and SG11 which are identical with steps SF10 and SF11. With steps SG10 and SG11 repeatedly implemented until the affirmative decision is obtained in step SG10, the regenerative braking torque of the motor/generator 14 is held at the constant small value. Broken line in FIG. 21 indicates the regenerative braking torque in the present ninth embodiment of FIG. 22.

In the present embodiment of FIG. 22, the output of the drive power source (engine 12) is held substantially constant when the power transmitting device in the form of the automatic transmission 18 is switched from the non-drive state to the drive state in response to the operation of the shift lever 42 from the neutral or parking position "N", "P" to the drive or reverse position "D", "R", whereby the power transmitting device can be smoothly switched to the drive state with a reduced shifting shock.

Figure 23:
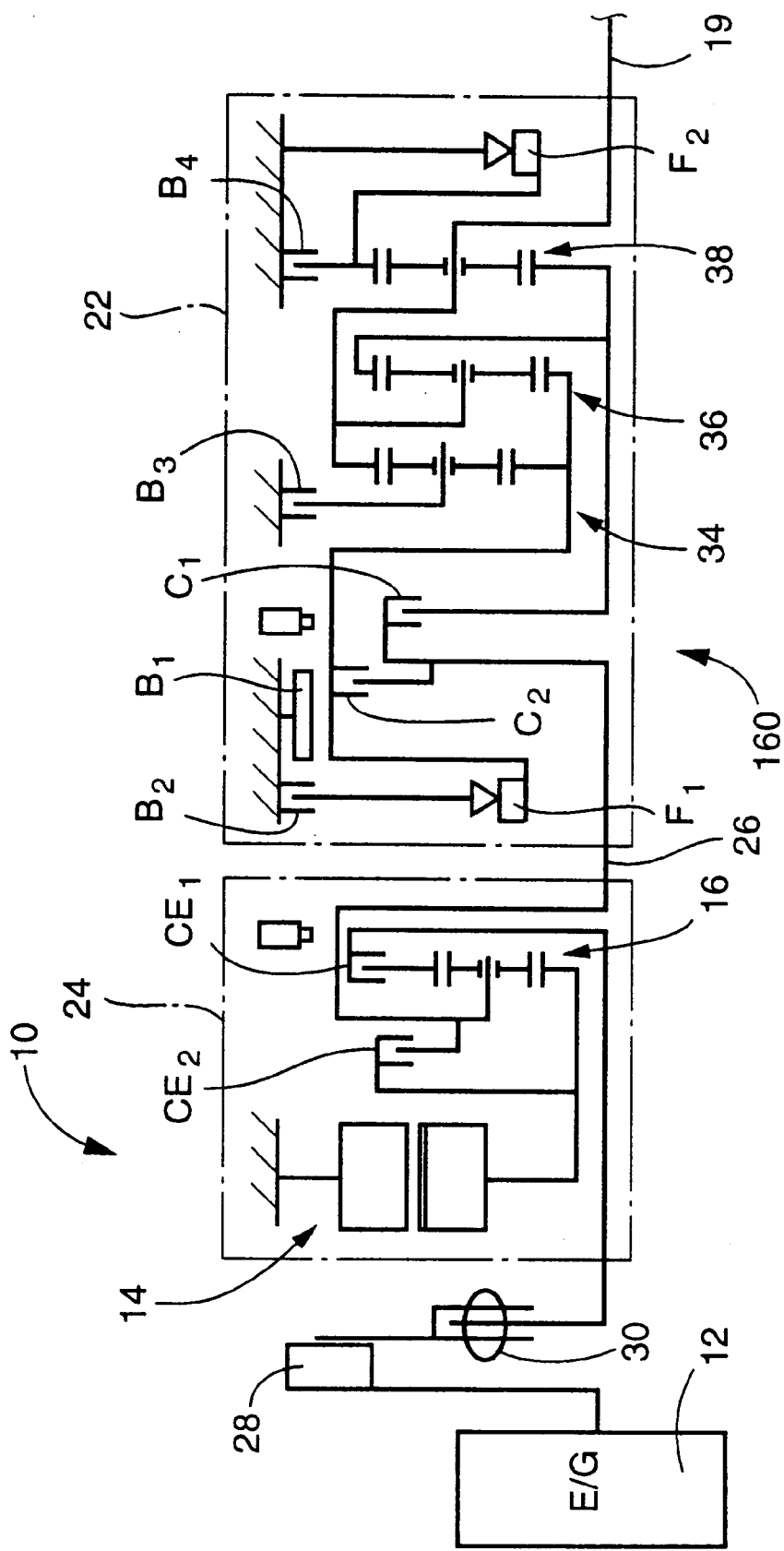
FIG. 23 is a schematic view showing a hybrid drive system according to a further embodiment of the invention.

While the seventh, eighth and ninth embodiments of FIGS. 18, 20 and 22 apply to the hybrid drive system 18 of FIG. 1, these embodiments are equally applicable to a hybrid drive system as shown in FIG. 23, which is constructed according to a tenth embodiment of the invention. This hybrid drive system of FIG. 23 uses an automatic transmission 160 which does not include the auxiliary transmission 20 and employs only the primary transmission 22. While the automatic transmission 18 of the hybrid drive system of FIG. 1 has one rear drive position and five forward drive positions, the automatic transmission 160 used according to the present tenth embodiment has one rear drive position and four forward drive positions, as indicated in FIG. 24.

While the present invention has been described above in its presently preferred embodiments by reference to the accompanying drawings, it is to be understood that the invention may be otherwise embodied.

In the first, second and third embodiments, the shift boundary lines of the transmission shifting and mode selecting data maps of FIGS. 11A and 11B are used for determining both shift-up and shift-down actions of the automatic transmission 18. For avoiding frequent shifting actions of the automatic transmission, however, it is desirable to use two sets of shift boundary lines with respective hysteresis characteristics, one for the shift-up actions and the other for the shift-down actions.

While the first embodiment is adapted to inhibit a change of the operation mode only when the 2→3 clutch-to-clutch shifting actions of the automatic transmission take place. However, the principle of restricting a change of the operation mode in the first embodiment is applicable to other shifting actions of the automatic transmission, such as a shifting action effected by controlling a one-way clutch, for minimizing a shifting shock of the automatic transmission upon changing of the operation mode.

Although the routines of FIGS. 18, 20 and 22 are used in the respective seventh, eighth and ninth embodiments, the features of these routines may be incorporated in one routine. For instance, the step SE5 of the routine of FIG. 18 and the step SF9 of the routine of FIG. 20 may be provided in one routine. Described more specifically, the power transfer from the drive power source to the automatic transmission 18 can be cut if the operating amount $\theta_{AC}$ of the accelerator pedal is comparatively small, even when the automatic transmission 18 is switched from the non-drive state to the drive state. In this case, therefore, the step SF9 is implement to cut the power transfer. When the operating amount $\theta_{AC}$ is comparatively large, on other hand, it is desirable not to cut the power transfer to the automatic transmission 18 since the vehicle operator desires to start the vehicle with high acceleration. In this case, the step SE5 is implemented to inhibit a change of the operation mode, without cutting the power transfer to the automatic transmission 18.

It is to be understood that the present invention may be embodied with various other changes, modifications and improvements, which may occur to those skilled in the art, in the light of the foregoing teaching.

What is claimed is:

1. A hybrid drive system for a motor vehicle, comprising:
    a drive power source including an engine operated by combustion of a fuel, and an electric motor operated with an electric energy, at least one of said engine and said electric motor being operated for driving the motor vehicle in a plurality of operation modes;
    an automatic transmission which is disposed between said drive power source and a drive wheel of the motor vehicle and whose speed ratio is variable;
    mode selecting means for selecting one of said plurality of operation modes, according to a predetermined mode selecting pattern;
    shift control means for controlling said automatic transmission to change a speed ratio thereof, according to a predetermined shifting pattern; and
    mode change restricting means for restricting a change of the operation mode of the motor vehicle by said mode selecting means when the speed ratio of said automatic transmission is changed by said shift control means.

2. A hybrid drive system according to claim 1, wherein said mode change restricting means includes determining means for determining whether a shifting action of said automatic transmission is terminated, said mode change restricting means inhibiting said mode selecting means from changing the operation mode until said determining means has determined that said shifting action of the automatic transmission is terminated, said hybrid drive system further comprising means for permitting said mode selecting means to change the operation mode after said determining means has determined that said shifting action of the automatic transmission is terminated.

3. A hybrid drive system according to claim 1, wherein said automatic transmission further comprises two clutches for establishing a forward drive position when said automatic transmission engages a first clutch of said two clutches while at the same time releasing a second clutch of said two clutches, said mode change restricting means inhibiting said mode selecting means from changing the operation mode while said automatic transmission is shifted to said forward drive position.

4. A hybrid drive system according to claim 1, further comprising determining means for determining whether a rate of increase in an output of said drive power source currently desired by an operator of the motor vehicle is higher than a predetermined threshold, said mode change restricting means is disabled to inhibit said mode selecting means from changing the operation mode when said determining means determines that said rate of increase is higher than said predetermined threshold.

5. A hybrid drive system according to claim 4, wherein said determining means determines whether a rate of increase in an operating amount of an accelerator pedal of the motor vehicle is higher than said predetermined threshold.

6. A hybrid drive system according to claim 1, wherein said mode change restricting means interrupts said change of the operation mode by said mode selecting means when the speed ratio of the automatic transmission is changed by the shift control means, said hybrid drive system further comprising means for permitting said mode selecting means to resume said change of the operation mode when the speed ratio of the automatic transmission has been changed by said shift control means.

7. A hybrid drive system for a motor vehicle, comprising:
a drive power source including an engine operated by combustion of a fuel, and an electric motor operated with an electric energy, at least one of said engine and said electric motor being operated for driving the motor vehicle in a plurality of operation modes;
an automatic transmission which is disposed between said drive power source and a drive wheel of the motor vehicle and whose speed ratio is variable;
mode selecting means for selecting one of said plurality of operation modes, according to a predetermined mode selecting pattern;
shift control means for controlling said automatic transmission to change a speed ratio thereof, according to a predetermined shifting pattern; and
shifting restricting means for restricting a change of the speed ratio of the automatic transmission when the operation mode is changed by said mode selecting means.

8. A hybrid drive system according to claim 7, wherein said shifting restricting means includes determining means for determining whether a change of the operation mode by said mode selecting means is completed, said shifting restricting means inhibiting said shift control means from changing the speed ratio of the automatic transmission until said determining means has determined that said change of the operation mode is completed, said hybrid drive system further comprising means for permitting said shift control means to change the speed ratio of the automatic transmission after said determining means has determined that said change of the operation mode is completed.

9. A hybrid drive system according to claim 7, further comprising mode change restricting means for restricting a change of the operation mode by said mode selecting means when the speed ratio of said automatic transmission is changed by said shift control means.

10. A hybrid drive system according to claim 9, wherein said mode change restricting means includes determining means for determining whether a shifting action of said automatic transmission is terminated, said mode change restricting means interrupting said change of the operation mode until said determining means has determined that said shifting action is terminated, said hybrid drive system further comprising means for permitting said mode selecting means to resume said change of the operation mode after said determining means has determined that said shifting action is terminated.

11. A hybrid drive system according to claim 7, wherein said shifting restricting means restricts a shift-up action of said automatic transmission which takes place when an output of said drive power source currently required by an operator of the motor vehicle is reduced.

12. A hybrid drive system for a motor vehicle, comprising:
a drive power source including an engine operated by combustion of a fuel, and an electric motor operated with an electric energy, at least one of said engine and said electric motor being operated for driving the motor vehicle in a plurality of operation modes;
an automatic transmission which is disposed between said drive power source and a drive wheel of the motor vehicle and whose speed ratio is variable;
mode selecting means for selecting one of said plurality of operation modes, according to a predetermined mode selecting pattern, said mode selecting pattern including a mode selecting boundary line used by said mode selecting means for determining whether the operation mode should be changed between one and another of said plurality of operation modes;
shift control means for controlling said automatic transmission to change a speed ratio thereof, according to a predetermined shifting pattern; and
memory means for storing data representative of said predetermined shifting pattern, said predetermined shifting pattern including at least one first shift boundary line used by said shift control means for determining whether the speed ratio of said automatic transmission should be changed in said one of said plurality of operation modes, and at least one second shift boundary line used by said shift control means for determining whether the speed ratio of said automatic transmission should be changed in said another of said plurality of operation modes, said at least one first shift boundary line and said at least one second shift boundary line being continuous with each other, at said mode selecting boundary line.

13. A hybrid drive system according to claim 12, wherein each of said first and second boundary lines of said predetermined shifting pattern represented by the data stored in the memory means represents a relationship between two operating parameters of the motor vehicle and which is used by said shift control means for determining, on the basis of said two operating parameters, whether said automatic transmission should be shifted between two operating positions having respective two different speed ratio values.

14. A hybrid drive system according to claim 13, wherein said two operating parameters consist of a running speed of the motor vehicle and an operating amount of an accelerator pedal of the motor vehicle.

15. A hybrid drive system according to claim 13, wherein said mode selecting boundary line of said predetermined mode selecting pattern represents a relationship between said two operating parameters of the motor vehicle and which is used by said mode selecting means for determining, on the basis of said two operating parameter, whether the operation mode should be changed from one of said one operation mode to said another operation mode and said another operation mode to said one operation mode.

16. A hybrid drive system according to claim 15, where said one operation mode is an engine drive mode in which only said engine is operated as the drive power source, and said another operation mode is a motor drive mode in which only said electric motor is operated as the drive power source.

17. A hybrid drive system according to claim 16, wherein each of said at least one first shift boundary line is determined so as to minimize a fuel consumption of said engine in said engine drive mode, and each of said at least one second shift boundary line is determined such that said each second shift boundary line is continuous with the corresponding first shift boundary line, at said mode selecting boundary line.

18. A hybrid drive system for a motor vehicle, comprising:

a drive power source including an engine operated by combustion of a fuel, and an electric motor operated with an electric energy, at least one of said engine and said electric motor being operated for driving the motor vehicle in a plurality of operation modes;

a torque distributing mechanism disposed between said drive power source and front and rear drive wheels of the motor vehicle, for distributing a torque to said front and rear drive wheels;

mode selecting means for selecting one of said plurality of operation modes, according to a predetermined mode selecting pattern;

torque distribution ratio changing means for controlling said torque distributing mechanism to change a ratio of distribution of the torque to said front and rear drive wheels, according to a predetermined torque distributing pattern; and mode change restricting means for restricting a change of the operation mode of the motor vehicle by said mode selecting means when the ratio of distribution of said torque is changed by said torque distribution ratio changing means.

19. A hybrid drive system according to claim 18, wherein said mode change restricting means includes determining means for determining whether a change of said ratio of distribution of said torque by said torque distribution ratio changing means is terminated, said mode change restricting means inhibiting said mode selecting means from changing the operation mode until said determining means has determined that said change of said ratio of distribution of said torque is terminated, said hybrid drive system further comprising means for permitting said mode selecting means to change the operation mode after said determining means has determined that said change of said ratio of distribution of said torque is terminated.

20. A hybrid drive system according to claim 18, further comprising determining means for determining whether a rate of increase in an output of said drive power source currently desired by an operator of the motor vehicle is higher than a predetermined threshold, said mode change restricting means is disabled to inhibit said mode selecting means from changing the operation mode when said determining means determines that said rate of increase is higher than said predetermined threshold.

21. A hybrid drive system according to claim 20, wherein said determining means determines whether a rate of increase in an operating amount of an accelerator pedal of the motor vehicle is higher than said predetermined threshold.

22. A hybrid drive system for a motor vehicle, comprising:

a drive power source including an engine operated by combustion of a fuel, and an electric motor operated with an electric energy, at least one of said engine and said electric motor being operated for driving the motor vehicle in a plurality of operation modes;

a torque distributing mechanism disposed between said drive power source and front and rear drive wheels of the motor vehicle, for distributing a torque to said front and rear drive wheels;

mode selecting means for selecting one of said plurality of operation modes, according to a predetermined mode selecting pattern;

torque distribution ratio changing means for controlling said torque distributing mechanism to change a ratio of distribution of the torque to said front and rear drive wheels, according to a predetermined torque distributing pattern; and torque distribution ratio change restricting means for restricting a change of said ratio of distribution of said torque by said torque distribution ratio changing means when the operation mode is changed by said mode selecting means.

23. A hybrid drive system according to claim 22, wherein said torque distribution ratio change restricting means includes determining means for determining whether a change of the operation mode by said mode selecting means is terminated, said torque distribution ratio change restricting means inhibiting said torque distribution ratio changing means from changing said ratio of distribution of said torque until said determining means has determined that said change of the operation mode is terminated, said hybrid drive system further comprising means for permitting said torque distribution ratio changing means to change the ratio of distribution of said torque after said determining means has determined that said change of the operation mode is terminated.

24. A hybrid drive system according to claim 22, further comprising mode change restricting means for restricting a change of the operation mode by said mode selecting means when said ratio of distribution of said torque is changed by said torque distribution ratio changing means.

25. A hybrid drive system according to claim 24, wherein said mode change restricting means includes determining means for determining whether a change of said ratio of distribution of said torque is terminated, said mode change restricting means interrupting said change of the operation mode until said determining means has determined that said change of the ratio of distribution of said torque is terminated, said hybrid drive system further comprising means for permitting said mode selecting means to resume said change of the operation mode after said determining means has determined that said change of the ratio of distribution of said torque is terminated.

26. A hybrid drive system for a motor vehicle, comprising:

a drive power source including an engine operated by combustion of a fuel, and an electric motor operated with an electric energy, at least one of said engine and said electric motor being operated for driving the motor vehicle in a plurality of operation modes;

mode selecting means for selecting one of said plurality of operation modes, according to a predetermined mode selecting pattern;

a power transmitting device disposed between said drive power source and a drive wheel of the motor vehicle, said power transmitting device having a non-drive state and a drive state;

manually operated transmission switching means for switching said power transmitting device between said non-drive and non-drive states; and mode change restricting means for restricting a change of the operation mode of the motor vehicle by said mode selecting means when the power transmitting device is switched from said non-drive state to said drive state, by said manually operated transmission s witching means.

27. A hybrid drive system according to claim 26, wherein said manually operated transmission switching means includes a manually operated shift lever, and a manual shift valve mechanically connected to said shift lever for selectively placing said power transmitting device in said non-drive state and said drive state.

28. A hybrid drive system according to claim 26, further comprising determining means for determining whether said power transmitting device has been switched from said non-drive state to said drive state, and wherein said mode change restricting means inhibits a change of said operation mode until said determining means has determined that said power transmitting device has been switched to said drive state, said hybrid drive system further including means for permitting said change of said operation mode after said power transmitting device has been switched to said drive state.

29. A hybrid drive system for a motor vehicle, comprising:
- a drive power source including an engine operated by combustion of a fuel, and an electric motor operated with an electric energy, at least one of said engine and said electric motor being operated for driving the motor vehicle in a plurality of operation modes;
- mode selecting means for selecting one of said plurality of operation modes, according to a predetermined mode selecting pattern;
- a power transmitting device disposed between said drive power source and a drive wheel of the motor vehicle, said power transmitting device having a non-drive state and a drive state;
- manually operated transmission switching means for switching said power transmitting device between said non-drive and non-drive states; and
- input cutting means for cutting a power transfer from said drive power source to said power transmitting device when the power transmitting device is switched from said non-drive state to said drive state by said manually operated transmission switching means.

30. A hybrid drive system according to claim 29, wherein said plurality of operation modes include an engine drive mode in which only said engine is operated to drive the motor vehicle, said hybrid drive system further comprising a synthesizing and distributing mechanism having a first rotary element connected to said engine, a second rotary element connected to said electric motor, and a third rotary element connected to said power transmitting device, and wherein said input cutting means is operable when said engine drive mode is selected, to place said electric motor in a non-load state in which said electric motor is freely rotatable, whereby the power transfer from said engine to said power transmitting device is cut by said input cutting means when said engine drive mode is selected.

31. A hybrid drive system according to claim 29, wherein said manually operated transmission switching means includes a manually operated shift lever, and a manual shift valve mechanically connected to said shift lever for selectively placing said power transmitting device in said non-drive state and said drive state.

32. A hybrid drive system according to claim 29, further comprising determining means for determining whether said power transmitting device has been switched from said non-drive state to said drive state, and wherein said input cutting means cuts said power transfer until said determining means has determined that said power transmitting device has been switched to said drive state, said hybrid drive system further including means for permitting said power transfer after said power transmitting device has been switched to said drive state.

33. A hybrid drive system for a motor vehicle, comprising:
- a drive power source including an engine operated by combustion of a fuel, and an electric motor operated with an electric energy, at least one of said engine and said electric motor being operated for driving the motor vehicle in a plurality of operation modes;
- mode selecting means for selecting one of said plurality of operation modes, according to a predetermined mode selecting pattern;
- a power transmitting device disposed between said drive power source and a drive wheel of the motor vehicle, said power transmitting device having a non-drive state and a drive state;
- manually operated transmission switching means for switching said power transmitting device between said non-drive and non-drive states; and
- output control means for holding an output of said drive power source substantially constant while the power transmitting device is switched from said non-drive state to said drive state by said manually operated transmission switching means.

34. A hybrid drive system according to claim 33, wherein said manually operated transmission switching means includes a manually operated shift lever, and a manual shift valve mechanically connected to said shift lever for selectively placing said power transmitting device in said non-drive state and said drive state.

35. A hybrid drive system according to claim 33, further comprising determining means for determining whether said power transmitting device has been switched from said non-drive state to said drive state, and wherein said output control means holds the output of said drive power source substantially constant until said determining means has determined that said power transmitting device has been switched to said drive state, said hybrid drive system further including means for permitting the output of said drive power source to be changed after said power transmitting device has been switched to said drive state.

* * * * *